US012458565B2

(12) United States Patent
Williams

(10) Patent No.: US 12,458,565 B2
(45) Date of Patent: Nov. 4, 2025

(54) STICK-SLIP FRICTIONAL SWIVEL COUPLING FOR A MASSAGE TOOL RECIPROCATED AT FORCED FREQUENCY

(71) Applicant: Eddy Arnold Williams, Pocatello, ID (US)

(72) Inventor: Eddy Arnold Williams, Pocatello, ID (US)

( * ) Notice: Subject to any disclaimer, the term of this patent is extended or adjusted under 35 U.S.C. 154(b) by 0 days.

(21) Appl. No.: 18/739,225

(22) Filed: Jun. 10, 2024

(65) Prior Publication Data

US 2024/0325242 A1 Oct. 3, 2024

Related U.S. Application Data

(63) Continuation-in-part of application No. 18/083,955, filed on Dec. 19, 2022, now Pat. No. 12,005,022,
(Continued)

(51) Int. Cl.
*A61H 23/02* (2006.01)
*A61H 23/00* (2006.01)

(52) U.S. Cl.
CPC ....... *A61H 23/0254* (2013.01); *A61H 23/006* (2013.01); *A61H 2023/002* (2013.01);
(Continued)

(58) Field of Classification Search
CPC .................. A61H 23/006; A61H 23/02; A61H 1/006–008; A61H 2201/0153;
(Continued)

(56) References Cited

U.S. PATENT DOCUMENTS 703,100 A * 6/1902 Wantz ................ A61H 23/0254 310/239
732,356 A * 6/1903 Joseph ............... A61H 23/0254 74/48

(Continued)

FOREIGN PATENT DOCUMENTS

CN 211610679 U * 10/2020
CN 213588996 U * 7/2021

(Continued)

OTHER PUBLICATIONS

English translation for CN 114668648, machined translated by espacenet.com, translated on Dec. 27, 2024.*

(Continued)

*Primary Examiner* — Tu A Vo
(74) *Attorney, Agent, or Firm* — Burdick Patents, P.A.; Sean D. Burdick; Colin L. Honan

(57) ABSTRACT

A hand-held massaging system includes a swivel coupling for removably attaching a massage tool to a reciprocating motor having a shaft having a stroke axis and a stroke length. The swivel coupling consists of a thrust journal and a cylindrical cup, an inner diameter of the cup providing a swivel bearing and bottom of the cup forming a thrust bearing. When the shaft reciprocates at a forced frequency, the thrust journal is retained within the cup by stick-slip friction that allows the thrust journal to swivel within the cup and to slip along the stroke axis. The thrust journal and cup attach between the massage tool and the shaft.

23 Claims, 14 Drawing Sheets

SECTION G-G

Related U.S. Application Data which is a continuation of application No. 16/968,866, filed on Aug. 10, 2020, now Pat. No. 11,529,284.

(52) U.S. Cl.
CPC ................ *A61H 2201/0153* (2013.01); *A61H 2201/149* (2013.01); *A61H 2201/1678* (2013.01); *A61H 2201/1685* (2013.01)

(58) Field of Classification Search
CPC ........ A61H 2201/12; A61H 2201/1685; A61H 2201/107; A61H 2201/169; A61H 2201/149; A61H 7/004–005
See application file for complete search history.

(56) References Cited

U.S. PATENT DOCUMENTS

| | | | | | |
|---|---|---|---|---|---|
| 735,968 | A | * | 8/1903 | Grobe | A61H 23/0254 433/122 |
| 1,340,959 | A | | 5/1920 | Jones | |
| 1,796,444 | A | | 3/1931 | Dell et al. | |
| 2,076,410 | A | | 4/1937 | Mcgerry | |
| 2,078,025 | A | | 4/1937 | Samuels | |
| 3,837,335 | A | | 9/1974 | Teranishi | |
| 3,984,890 | A | | 10/1976 | Collis | |
| 4,079,733 | A | * | 3/1978 | Denton | A61H 23/0254 601/108 |
| 4,088,128 | A | | 5/1978 | Mabuchi | |
| 4,414,963 | A | * | 11/1983 | Kunz | A61H 7/004 601/134 |
| 4,495,940 | A | | 1/1985 | Takaishi | |
| 4,549,535 | A | | 10/1985 | Wing | |
| 4,566,442 | A | | 1/1986 | Mabuchi et al. | |
| 4,716,890 | A | | 1/1988 | Bichel | |
| 4,730,605 | A | | 3/1988 | Noble et al. | |
| 4,841,955 | A | | 6/1989 | Evans et al. | |
| 5,140,979 | A | | 8/1992 | Nakagawa | |
| 5,300,095 | A | | 4/1994 | Salazar | |
| 5,618,315 | A | | 4/1997 | Elliott | |
| 5,626,615 | A | | 5/1997 | Keller et al. | |
| 5,632,765 | A | | 5/1997 | Holder | |
| 5,951,501 | A | | 9/1999 | Griner | |
| 6,228,042 | B1 | | 5/2001 | Dungan | |
| 6,805,700 | B2 | | 10/2004 | Miller | |
| 10,357,425 | B2 | | 7/2019 | Wersland et al. | |
| 10,470,970 | B2 | | 11/2019 | Nazarian et al. | |
| 10,557,490 | B2 | | 2/2020 | Wersland et al. | |
| 11,723,830 | B1 | * | 8/2023 | Marton | A61H 23/006 601/108 |
| 2002/0107459 | A1 | * | 8/2002 | Chang | A61H 7/005 601/97 |
| 2006/0047315 | A1 | * | 3/2006 | Colloca | H01F 7/1607 601/108 |
| 2016/0367425 | A1 | * | 12/2016 | Wersland | A61H 1/008 |
| 2021/0022951 | A1 | * | 1/2021 | Hu | A61H 9/0021 |
| 2021/0113427 | A1 | * | 4/2021 | Liu | A61H 23/0254 |
| 2022/0151865 | A1 | * | 5/2022 | Hu | A61H 23/02 |
| 2022/0168176 | A1 | * | 6/2022 | Coleman | A61H 23/006 |
| 2023/0329965 | A1 | * | 10/2023 | Williams | A61H 23/006 |
| 2023/0355464 | A1 | * | 11/2023 | Williams | A61H 23/006 |
| 2023/0398034 | A1 | * | 12/2023 | Coleman | A61H 7/001 |
| 2024/0000656 | A1 | * | 1/2024 | Danby | A61H 23/0254 |

FOREIGN PATENT DOCUMENTS

| | | | | |
|---|---|---|---|---|
| CN | 214105577 | U | * | 9/2021 |
| CN | 215308150 | U | * | 12/2021 |
| CN | 215425995 | U | * | 1/2022 |
| CN | 215607530 | U | * | 1/2022 |
| CN | 216022038 | U | * | 3/2022 |
| CN | 114668648 | A | * | 6/2022 |
| CN | 216985653 | U | * | 7/2022 |
| CN | 115721546 | A | * | 3/2023 |
| CN | 115957118 | A | * | 4/2023 |
| CN | 219681108 | U | * | 9/2023 |
| KR | 200443540 | Y1 | * | 2/2009 |

OTHER PUBLICATIONS

International Preliminary Report on Patentability issued on Oct. 25, 2021 for PCT/US2020/027342.

Pado Inc. "PureWave" web pages, Feb. 24, 2019, avail. at https://padousa.com.

Theragun Inc. "Theragun" web pages, Mar. 8, 2019, avail. at https://theragun.com.

* cited by examiner

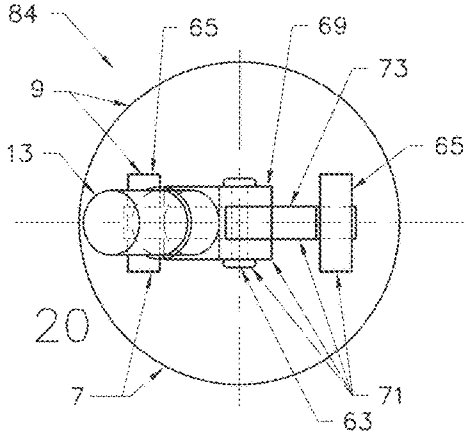
FIG. 20
FIG. 21
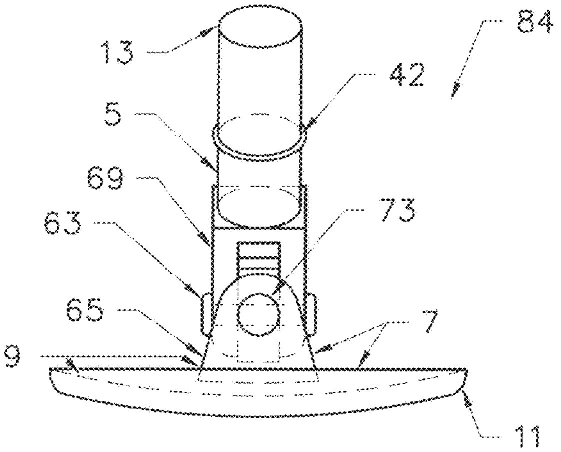
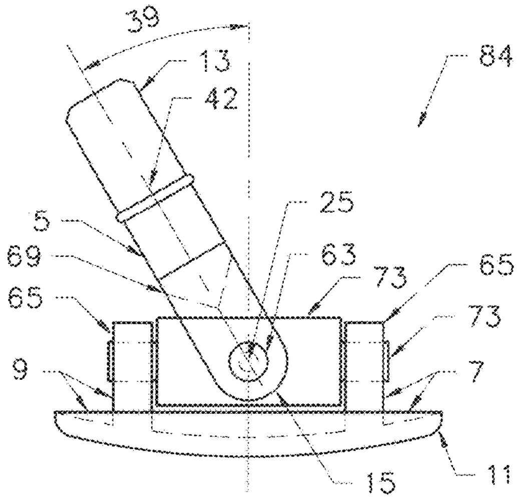
FIG. 22
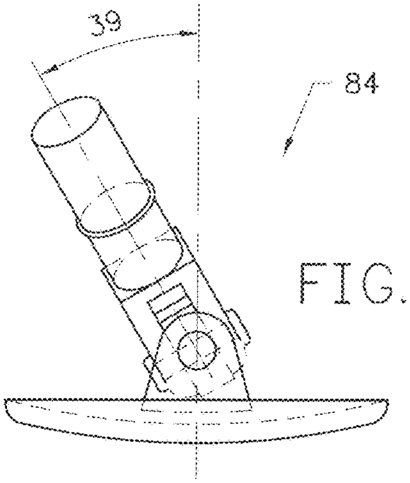
FIG. 23

SECTION G-G

SECTION G-G

SECTION H-H

STICK-SLIP FRICTIONAL SWIVEL COUPLING FOR A MASSAGE TOOL RECIPROCATED AT FORCED FREQUENCY

RELATED APPLICATIONS

This application is a continuation-in-part of U.S. application Ser. No. 18/083,955 filed Dec. 19, 2022, which is a continuation of U.S. application Ser. No. 16/968,866 filed Aug. 10, 2020, which is a national stage entry that claims priority to PCT/US20/27342 filed Apr. 8, 2020, which in turn claims priority to U.S. Provisional Application 62/830,698 filed on Apr. 8, 2019 and to U.S. Provisional Application 62/950,112 filed on Dec. 19, 2019, all of which are fully incorporated herein by reference.

BACKGROUND OF THE INVENTION

Field of the Invention

The present invention relates generally to powered massage tools and reciprocating massage tools, more specifically to a massage tool rotatably attachable to a hand-held reciprocating motor, and most specifically to a powered massaging system reciprocating at a forced frequency and having a swivel coupling that retains massage tools by stick-slip friction.

DESCRIPTION OF RELATED ART

Massage therapists, sports trainers and chiropractors are now using various types of reciprocating motors driving variously shaped tools that contact the patient's body to provide treatment, alignment adjustment, muscle relaxation, massage, pain relief and other therapies. Reciprocating motors for these devices have included using springs, electric solenoids, rotating motors with eccentric weights, rotating motors driving reciprocating rods with direct linkages such as cams and cranks, and fluid driven pistons. Since the development and mass production of electric and battery powered carpentry jigsaws, these reciprocating motors are being converted for use as therapy devices by replacing the saw blade with a body contact tool. Common with current reciprocating therapy devices is a body contact tool that is rigidly attached to a reciprocating rod driven by a reciprocating motor. Prior art has referred to body contact tools as impact heads, plungers, massage heads, massage fingers, and hitting pads. Body contact tools include differing shapes, sizes and materials of construction. To reduce impact force and pain some body contact tools are made of soft foam rubber or have spring buffers. Miller, U.S. Pat. No. 6,805,700 B2, discloses different impact heads attached to a reciprocating rod using a coupler that is pinned "so as to prevent rotation of the impact head." These types of devices with body contact tools connected at a fixed angle to the reciprocating rod are effective but have a small body surface contact area when applied at an angle or they must be applied at a specific angle to the body surface, usually perpendicular, to distribute forces applied to the body over a larger surface area. Small tool contact areas can be useful for some types of therapy but can cause pain and bruising and may not penetrate to deeper tissues and structures. Body contact tools acting perpendicular to the body surface, when used with a reciprocating motor that has a stroke exceeding ¼ inches, often provide too much motion and impact for delicate patients, sensitive joints, sore muscles and tender body tissues.

Traditional tapotement is manually performed by a therapist useing the hands, fingers or wrists to deliver rapid rhythmic strikes or taps against the body surface. Traditional tapotement includes orientation and shaping of the hands in different ways to produce differing therapeutic effects. The therapist may strike perpendicularly or at varying angles to the body surface. Tapotement techniques include patting with a flat or cupped hand, pecking or tapping using the fingertips, beating with a fist, hacking using the ulnar edge of the hand, pounding with one hand striking the back of the other hand that is placed on the patient, and numerous other striking techniques with considerable variation amongst practitioners on names and hand positions.

Massage devices using reciprocating motors and fixed body contact tools provide more rapid percussion rates and more powerful strokes than traditional tapotement but are not capable of articulating like a human hand to align at varying angles with the body surface. Such devices thus fall short of delivering a satisfactory tapotemental experience for the patient.

Current body contacting percussive massage tools couple to reciprocating motors using couplings that do not facilitate the massage tool swiveling about the stroke axis of the reciprocating shaft. Some couplings include threaded male and female components that are tightened against a stop to rigidly attach a massage tool. Some couplings use spring ball detents and other non-swiveling mechanical latches. Some couplings use a keyway to prevent the massage tool from swiveling. Other couplings use rubber o-rings or collars acting by friction between male and female components to secure the massage tool to the reciprocating shaft, the friction also preventing the massage tool from swiveling. Many friction couplings have a thrust flange formed on a male half of the coupling that has a larger diameter than the inserted male half of the coupling. This thrust flange bears against the outside of the female half of the coupling adding friction that inhibits the massage tool from swiveling.

For better treatment during body massage, an improved power massaging system and articulating massage tool is needed to overcome the aforesaid problems and more accurately mimic controlled natural tapotemental action provided by the hands and wrists of human therapists.

SUMMARY OF THE INVENTION

The present invention provides a massage tool for attachment to a reciprocating motor, such as a hand-held motor of a general size and form as those used for power jigsaws or for known hand-held reciprocating power massage tools. The invention includes a rod and a body follower having a proximal side and a distal side. The rod has a proximal end and a distal end, wherein the proximal end of the rod is configured for attachment to the reciprocating motor. The reciprocating motor has a stroke axis and a stroke length, and the distal end of the rod is configured to rotatably attach to the proximal side of the body follower by means of a rotating joint. The rotating joint defines a center of rotation for the rod as it rotates with respect to the body follower. The distal side of the body follower has a body contact area that has a maximum length at least three times greater than a minimum distance from the center of rotation of the rotating joint to the body contact area, and at least two times greater than the stroke length of the reciprocating motor. In another embodiment, the rotating joint is configured to allow the distal side of the body follower to remain parallel with the surface of the patient's body as the angle of the stroke axis with respect to the body contact area is varied by the operator from about 90 degrees to less than about 60 degrees.

Various alternative embodiments of the invention provide a swiveled coupling between the rod and the body follower, to allow an operator to translate the body follower around and against the contact area of a patient's body with six degrees of freedom. The massage tool is preferably configured for hand-held operation that allows an operator to freely position and move the body follower against the contours of a patient's body, apply and adjust force applied through the body contact area to the surface of the patient's body, and vary an angle of the stroke axis with respect to the body contact area. Preferably, the body contact area comprises a surface that curves in the proximal direction, allowing the body follower to slide along the surface of the patient's body while reciprocating against the surface of the patient's body without binding or gouging.

Various alternative embodiments of structure for coupling the rod to the reciprocating shaft are also disclosed. The rod may be removably couplable to the reciprocating shaft by keyless friction-fit, or by threaded engagement. Various alternative embodiments of swivel structures are also disclosed that permit the body follower to rotate in either of two orthogonal axes about the distal end of the rod. These structures include rotating joints formed as specialized ball and socket joints, hinges, gimbals, universal joints, flexures, and combinations of the foregoing. In one embodiment, the rotating joint includes a flexure that allows the angle of the stroke axis with respect to the body contact area to be varied by the operator from about 90 degrees to less than about 60 degrees. In another embodiment, flexure comprises a flexible portion and an inflexible portion. In more elaborate embodiments, a massage tool according to the invention includes a body follower having a distal side configured with a plurality of body contacting nubbins or flexible bristles.

In another embodiment, a massage tool according to the invention includes a rod having a plurality of distal ends, wherein each distal end is attached to a respective one of a plurality of body followers. The plurality of body followers may be symmetrically disposed about a plane passing through the stroke axis, and the rod may include a swiveling joint that allows the plurality of distal ends to rotate about the stroke axis. In another embodiment, a massage tool according to the invention includes a tool beam removably coupled to a shaft of a reciprocating motor.

In another embodiment, a massage system according to the invention exploits the phenomenon of stick-slip friction to provide a swivel coupling that attaches a massage tool to a reciprocating motor. The swivel coupling removably couples the massage tool to the reciprocating shaft of the reciprocating motor, wherein the shaft has a stroke axis and a stroke length. In its basic form, the swivel coupling includes a cup having a swivel bearing, a thrust bearing, a rim, and a coupling diameter, and includes a thrust journal stick-slip frictionally fit to the cup allowing the thrust journal to swivel within the swivel bearing and to slip along the stroke axis during reciprocation of the shaft. The swivel coupling may be configured with the thrust journal having an attachment end, and a thrust end opposite the attachment end, wherein the thrust end is configured to bear and swivel on the thrust bearing while the attachment end extends beyond the rim of the cup. Preferably, the swivel bearing has a length greater than about one and one half times the coupling diameter. Preferably, the swivel bearing has a length greater than the stroke length of the shaft. Preferably, the swivel coupling may be configured so that the thrust journal can be extracted from the swivel bearing by an axial force of less than 5 lbs when the shaft is not reciprocating. Preferably, the swivel coupling has a swiveling resistance of less than 20 ounce-inches of torque acting between the thrust journal and the swivel bearing. Preferably, the coupling diameter is less than five-eighths of an inch. Preferably, the thrust journal within the swivel bearing substantially restricts air flow to the thrust bearing.

Also disclosed are more elaborate implementations of the foregoing stick-slip frictional coupling. For example, the swivel coupling may further include a lubricant applied between the thrust journal and the swivel bearing. One or both of the thrust bearing and the thrust end may comprise a surface formed as a solid of revolution about a swivel axis defined by the thrust journal swiveling within the swivel bearing. The thrust journal may include a friction spring configured to be compressed when the thrust journal is inserted into the cup, and to engage the swivel bearing and provide frictional resistance to movement of the thrust journal within the cup. The swivel coupling may also include a slip groove formed in the swivel bearing, such that the slip groove has a diameter greater than the coupling diameter to allow the friction spring to extend within the slip groove when the thrust end abuts the thrust bearing, to provide a minimum frictional resistance acting between the thrust journal and the swivel bearing. The slip groove may have an axial taper between the coupling diameter and the slip groove diameter. Or, the slip groove may be designed with a cylindrical portion having the slip groove diameter, to allow the thrust end to slip away from the thrust bearing when the minimum frictional resistance acts between the thrust journal and the swivel bearing.

In other embodiments of the stick-slip frictional coupling the thrust journal may include a retention groove for retaining the friction spring, and the friction spring may be an o-ring. Or, the friction spring may be integrally formed on the thrust journal, the friction spring having friction shoes that engage the swivel bearing and extend within the slip groove. Preferably, the slip groove has an axial length less than the coupling diameter.

In any of the foregoing embodiments of the stick-slip frictional coupling, the cup may be attached to the reciprocating shaft and the thrust journal may be attached to the massage tool. Or, the thrust journal may be attached to the reciprocating shaft and the cup may be attached to the massage tool. In any of the foregoing embodiments, the cup may include an adapter configured to attach the swivel coupling to the reciprocating shaft or to the massage tool, or, the attachment end of the thrust journal may include an adapter configured to attach the swivel coupling to the reciprocating shaft or to the massage tool. And, any of the foregoing embodiments may include a resilient cushion located between the thrust bearing and the thrust end.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. Dimensions disclosed or shown are exemplary only. In the drawings, like reference numerals may designate like parts throughout the different views, wherein:

FIG. 20 is a top view of another embodiment of a massage tool according to the invention having a rotating joint formed as a universal joint on the proximal side of a body follower that is formed as a circular section of a sphere having rounded edges on its distal side.

FIG. 21 is a side view of the massage tool of FIG. 20.

FIG. 22 is another side view of the massage tool of FIG. 20, displaced by 90 degrees from the side view of FIG. 21.

FIG. 23 is an alternate side view of the massage tool of FIG. 20, wherein the rod is rotated with the cross axle showing the rod partially rotated on both axes.

DETAILED DESCRIPTION OF THE INVENTION

The following disclosure presents an engineered design for a massage tool for attachment to a reciprocating motor. The reciprocating motor is preferably encased in a chassis, similar to that of a hand-held power jigsaw or hand-held reciprocating power massagers. The massage tool of the present invention is designed to be lightweight and easily removably coupled to a reciprocating shaft of the reciprocating motor, to facilitate manual operation. Preferably, the distal end of the massage tool forms a body follower that may be contoured and/or constructed from a firm but resilient material for comfortable sliding engagement against various surfaces of a human body. A massage tool according to the present invention also preferably features one or more body followers that are coupled to one of various different types of swivelable rods, to enable a user to urge the body follower against and around the contours of the human body with six degrees of freedom.

Several illustrative embodiments of the invention are now disclosed with reference to the accompanying figures. To facilitate understanding, reference is made herein throughout to an operator and a patient; however these terms are not to be interpreted in a limiting sense. The operator is a person handling the massage tool, and may be a professional health care provider such as a chiropractor or massage therapist, or anyone else. The patient is the person whose body is engaged by the body follower of the massage tool when in use by an operator. The patient need not be someone in need of health care, as the invention may have non-medical uses that are purely recreational or relaxational. The operator and the patient may be one and the same; for example, the invention may be designed such that an operator of the massage tool may use it to massage his or her own neck, legs, or lower back.

Figure 2:
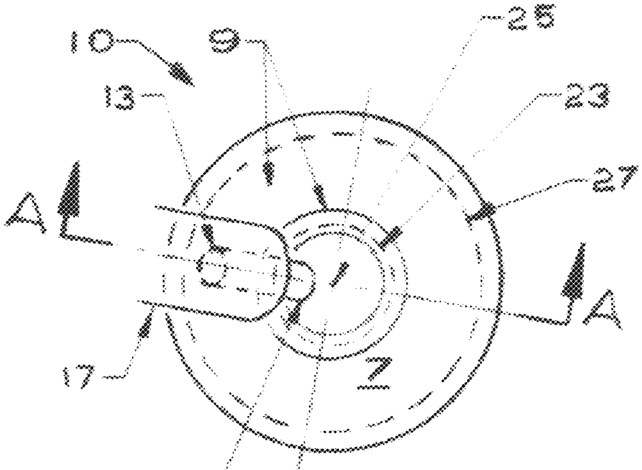
FIG. 2 is a top view of the massage tool of FIG. 1 seen from the proximal end looking toward the distal end.
Figure 1:
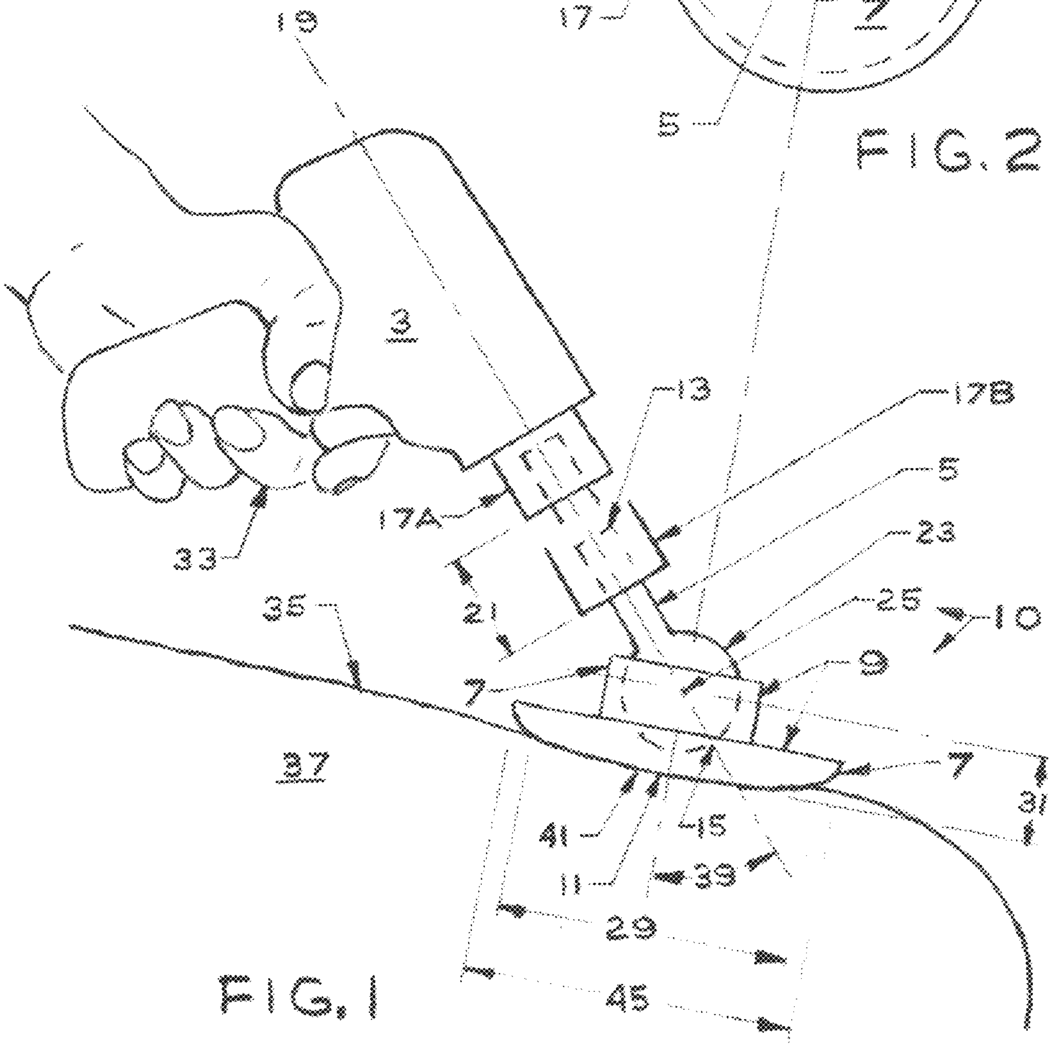
FIG. 1 is a side view of a massage tool according to one embodiment of the invention, shown in a state of use coupled to a hand-held reciprocating motor.

FIG. 1 shows a side view of a massage tool 10 according to one embodiment of the invention. The illustration shows massage tool 10 coupled to a hand-held reciprocating motor 3 in a state of use, being manipulated by the left hand of an operator 33 grasping the tool at its proximal end. The reciprocating motor 3 has a reciprocating shaft 17 which is shown in two positions 17A and 17B. The massage tool 10 also includes a rod 5 having a proximal end 13 and a distal end 15, and a body follower 7 having a proximal side 9 and a distal side 11. The reciprocating shaft 17 moves along a stroke axis 19 and has a stroke length 21. The stroke length 21 of the reciprocating shaft 17 is the distance between a fully retracted position 17A and a fully extended position 17B. The massage tool 10 is shown connected to the reciprocating shaft 17 at the extended position 17B. The proximal end 13 of rod 5 is removably coupled to the reciprocating shaft 17 allowing the massage tool 10 to be removed and replaced, preferably by hand without the use of a tool. The distal end 15 of rod 5 connects to the proximal side 9 the body follower 7 through a rotating joint 23 that has a center of rotation 25. The rotating joint 23 may take on many different forms, as will be disclosed further on herein. The distal side 11 of body follower 7 presses on a contact area on a surface 35 of a patient's body 37. During operation, the contact area on the patient's body may vary in both location and size as the body follower 10 is moved against and around the patient's body while maintaining contact therewith. For example, the contact area on the patient's body 37 may be a mere point where a portion of the distal side 11 of the body follower 7 barely touches the patient, or it may be a much larger area in a case where substantially all of the distal side 11 makes contact with the patient. The portion of the surface of the distal side 11 of the body follower 7 that is designed to press onto the contact area of the patient's body 37 is referred to herein as the body contact area 27 (FIG. 2). The body contact area 27 may also be defined in the absence of patient contact, as that portion of the distal surface of the body follower 7 that is substantially planar. When the center point of the distal side 11 of the body follower 7 rests on a horizontal plane, the substantially planar area on the distal surface of the body follower 7 is the area that includes all points on the distal surface through which a tangent line forms an angle with respect to the horizontal plane of about 9 degrees or less. When sufficient force is applied to the body follower 7 against a relatively large area of a patient's body (e.g. an upper thigh as shown in FIG. 1) to press substantially all of the distal side 11 of the body follower against the patient's body, the contact area on the surface of the patient's body 37 and the body contact area 27 of body follower 7 are substantially the same area. When less force is applied, the body contact area 27 will diminish to cover a lesser area of the patient's body that corresponds to length 29.

The configuration of the massage tool 10 by which it couples to the reciprocating shaft 17 and to the rotating joint 23, which is in turn rotatably coupled to the body follower 7, allows the operator 33 to manipulate the position of the body follower 7 with six degrees of freedom. For example, the operator 33 may adjust the force applied to the body follower 7 against the patient's body and the angle 39 of the stroke axis 19 with respect to the body contact area 27. The rotating joint 23 allows the distal side 11 of the body follower 7 to remain aligned with the surface of the patient's body when the complementary angle of the stroke axis 19 is reduced from 90 degrees to less than 60 degrees, which causes the body follower 7 to slide along the surface of the patient's body. As depicted in FIG. 1, the angle 39 is about 30 degrees, and its complementary angle, that is, the angle of the stroke axis 19 with respect to the surface of the patient's body, is about 60 degrees.

To allow the body follower 7 to be more easily translated along the surface of the patient's body, its distal side 11 may have a curved or contoured shape 41 so that it will tend to slide on, as it reciprocates against, the surface of the patient's body. Preferably, the contoured shape 41 is concave, when viewed from the perspective of FIG. 2; that is, the curvature of the body follower from its center toward its perimeter turns only toward the proximal direction. According to one embodiment of the invention, for the body follower 7 to slide freely along the surface of the patient's body without tipping or gouging an edge, the distal side of the body follower 7 may have a maximum length 45 at least three times greater than a minimum distance 31 from the center of rotation 25 of the rotating joint 23 to the distal side of the body follower 7. In addition, the length 45 of the distal side 11 of body follower 7 may be at least two times greater than the stroke length 21 of the reciprocating shaft 17.

FIG. 2 is a top view of massage tool 10, as seen from the proximal end of the tool looking toward the distal end of the tool. This figure defines a section A-A that provides a reference for several alternative embodiments 30, 40, 50 and 60 of a massage tool according to the invention, each varying somewhat in the design of a means for removably coupling the massage tool to the shaft 17 of a reciprocating motor 3.

Figure 3:
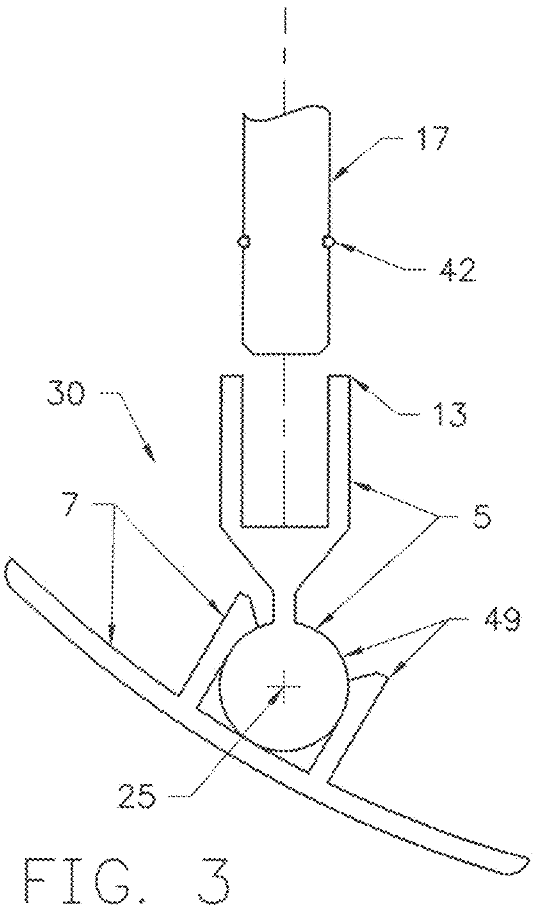
FIG. 3 is a partially exploded cross-sectional view, taken along section A-A of FIG. 2, showing one embodiment of a means for removably coupling the massage tool to a reciprocating shaft.

FIG. 3 shows a partially exploded cross-sectional view of a massage tool 30, taken along section A-A of FIG. 2. Massage tool 30 provides a means for removably coupling the rod 5 to the reciprocating shaft 17. In this embodiment, rod 5 includes a hollow channel sized to accommodate shaft 17. The shaft 17 has an o-ring 42 installed in a groove cut circumferentially into the shaft. When coupling the rod 5 to the shaft 17, operator forces the rod 5 by hand onto the shaft 17, and the o-ring 42 provides friction sufficient to maintain engagement of the shaft within the rod during operation of the massage tool.

Figure 4:
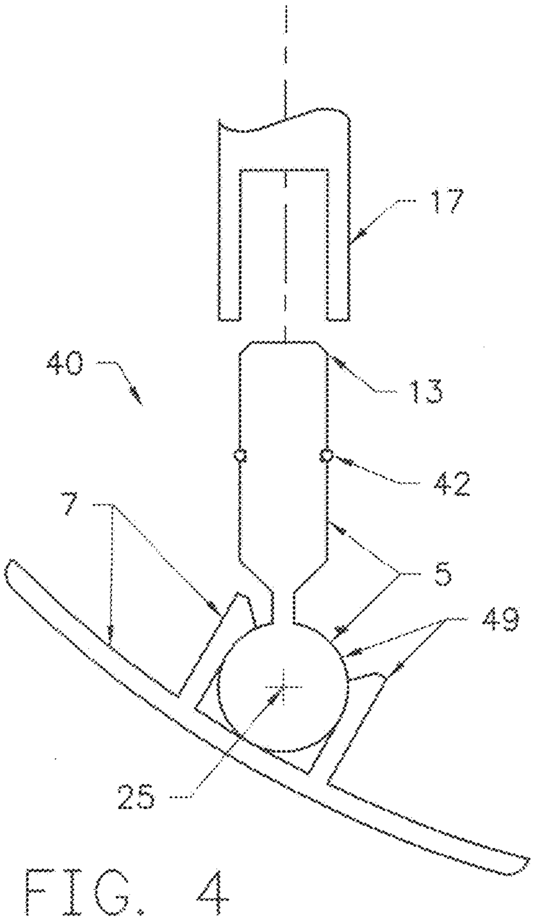
FIG. 4 is a partially exploded cross-sectional view, taken along section A-A of FIG. 2, showing a second embodiment of a means for removably coupling the massage tool to a reciprocating shaft.

FIG. 4 shows a partially exploded cross-sectional view of a massage tool 40, taken along section A-A of FIG. 2. Massage tool 40 provides an alternative means for removably coupling the rod 5 to the reciprocating shaft 17. In this embodiment, shaft 17 includes a hollow channel sized to accommodate the rod 5. O-ring 42 is installed in a circumferential groove that is formed on the rod 5. When coupling the rod 5 to the shaft 17, operator forces the rod by hand into the shaft 17, and the o-ring 42 provides friction sufficient to maintain engagement of the rod within the shaft during operation of the massage tool.

Figure 5:
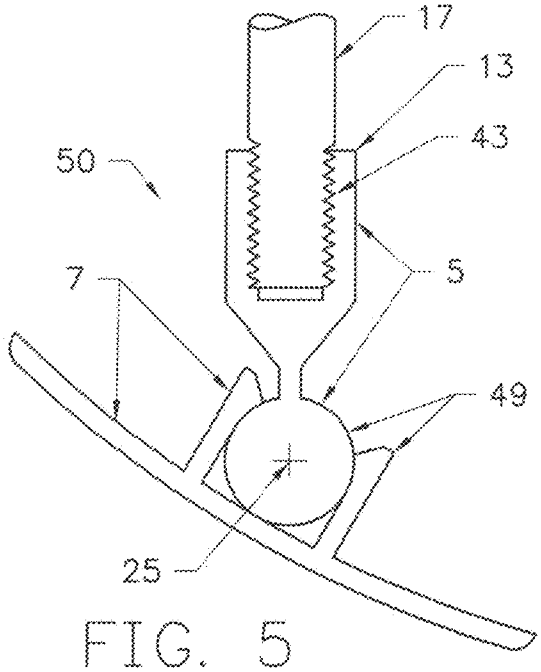
FIG. 5 is a cross-sectional view, taken along section A-A of FIG. 2, showing a third embodiment of a means for removably coupling the massage tool to a reciprocating shaft.

FIG. 5 is a cross-sectional view of a massage tool 50, taken nominally along section A-A of FIG. 2 for ease of illustration. Massage tool 50 represents a third embodiment of a means for removably coupling the rod 5 to a reciprocating shaft 17. Here, the rod 5 and shaft 17 are manually threadably engageable and disengageable by a set of mating threads 43. In this embodiment, the threads on rod 5 are formed as a female complement to male threads formed on shaft 17.

Figure 6:
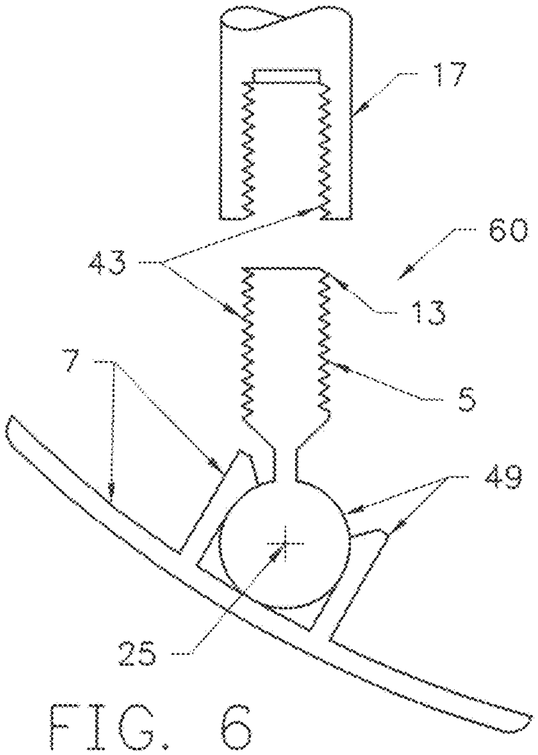
FIG. 6 is a partially exploded cross-sectional view, taken along section A-A of FIG. 2, showing a fourth embodiment of a means for removably coupling the massage tool to a reciprocating shaft.

FIG. 6 is a partially exploded cross-sectional view of a massage tool 60, taken nominally along section A-A of FIG. 2 for ease of illustration. Massage tool 60 is a fourth embodiment of a means for removably coupling the rod 5 to a reciprocating shaft 17, which is also effected by threaded engagement. The threaded engagement is similar to that of massage tool 50, except that the threads on rod 5 are formed as a male complement to female threads formed on shaft 17.

Figure 7:
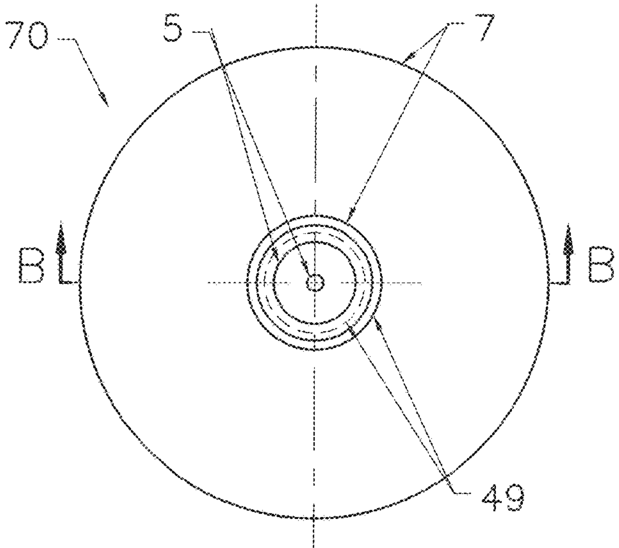
FIG. 7 is a top view of the proximal side another embodiment of a massage tool according to the invention having a rotating joint formed as a ball and socket joint on the proximal side of a circular body follower.

FIG. 7 is a top view of the proximal side of another embodiment according to the invention of a massage tool 70. Massage tool 70 has a rotating joint formed as a ball and socket joint 49 on the proximal side of a circular body follower 7. This figure defines a section B-B that provides a reference for several alternative embodiments 70, 72, 74, and 76 of a massage tool according to the invention, each varying somewhat in the design of the rotating joint 23.

Figure 8:
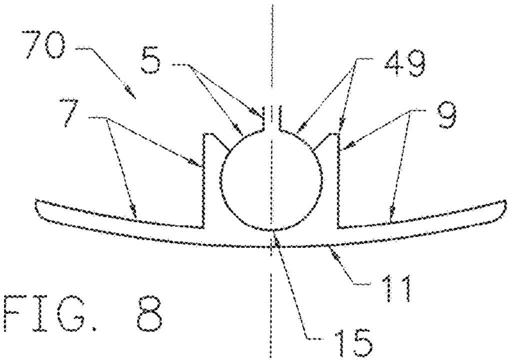
FIG. 8 is a cross-sectional view of the massage tool, taken along section B-B of FIG. 7.

FIG. 8 is a cross-sectional view of massage tool 70, taken along section B-B. The socket portion of the joint 49 is formed on the proximal side 9 of the body follower 7, and is preferably centrally placed thereon, as shown. Other embodiments of a massage tool are possible within the scope of the invention wherein the socket portion is formed on body follower 7 off-center. The ball portion of the joint 49 is formed on the distal end 15 of the rod 5. In this view, the rod 5 is shown aligned with the centerline of the figure and substantially perpendicular to the body contact area on the distal side 11 of the body follower 7. In operation, the rod 5 may be rotated with respect to the body contact area 27 about any axis passing through the center of rotation by an angle in the range of about 0 to 30 degrees from the vertical centerline. In another embodiment, the range of that angle may be about 0 to 45 degrees.

Figure 9:
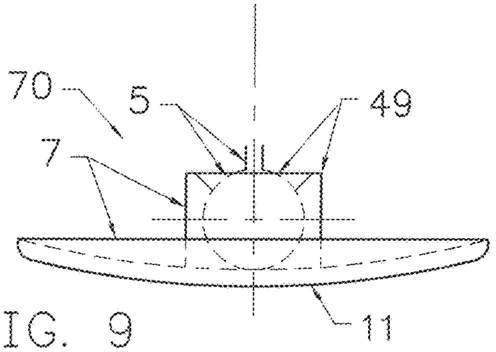
FIG. 9 is an elevation view of the massage tool of FIG. 7.

FIG. 9 is an elevation view of the massage tool 70, showing the center of rotation of the rotating joint 49 at the intersection of the centerlines. In this embodiment, the body contact area 27 on the distal side 11 of the body follower may be formed as a spherical section.

Figure 10:
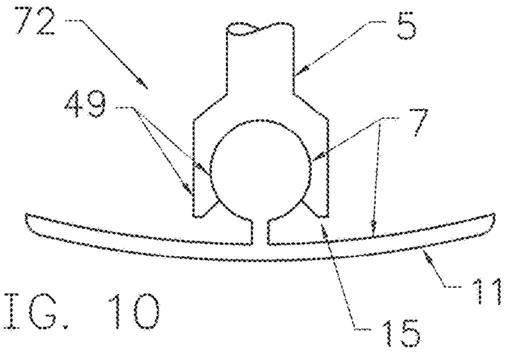
FIG. 10 is a cross-sectional view of another embodiment of a massage tool of the present invention having a rotating joint formed as a ball and socket joint on the proximal side of a body follower, taken nominally across section B-B of FIG. 7.

FIG. 10 is a cross-sectional view of another embodiment of a massage tool 72 of the present invention. The cross-sectional view is taken nominally along section B-B of FIG. 7 for ease of illustration. Massage tool 72 has a rotating joint formed as a ball and socket joint 49 on the proximal side of a circular or oblong body follower 7. In this embodiment, the ball and socket joint 49 is reversed from that of FIG. 8, with the ball portion being a part of and extending proximally from the body follower, and with the socket portion being formed on the distal end of the rod 5. This arrangement provides a range of angular rotation of the rod 5 with respect to the body contact area 27 of the body follower about any axis passing through the center of rotation, similar to the mechanics of massage tool 70.

Figure 11:
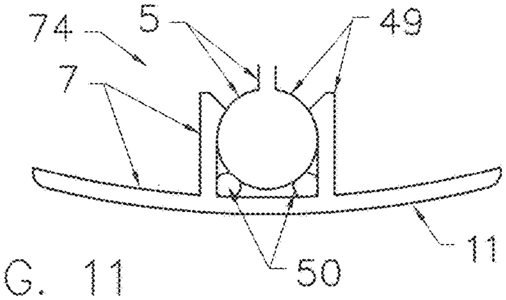
FIG. 11 is a cross-sectional view of another embodiment of a massage tool of the present invention having a rotating joint formed as a ball and socket joint on the proximal side of a body follower, taken nominally across section B-B of FIG. 7.

FIG. 11 is a cross-sectional view of another embodiment of a massage tool 74 of the present invention. The cross-sectional view is taken nominally across section B-B of FIG. 7 for ease of illustration. Massage tool 74 features a rotating joint formed as a ball and socket joint 49 on the proximal side of a circular or oblong body follower 7. A flexible cushion or rubber o-ring 50 is positioned between the body follower 7 and the ball portion of joint 49. Depending on the materials used to form massage tool 74, it may be desirable to include item 50 within the joint assembly to provide sufficient friction during rotation of the ball to enable the rod 5 to maintain a desired angular position with respect to the body follower when the rod is under force of gravity alone, or in combination with the force of the reciprocating shaft 17. At the same time, item 50 should be selected to limit the rotational friction of the ball within the socket to enable the operator to rotate the body follower without undue difficulty.

Figure 12:
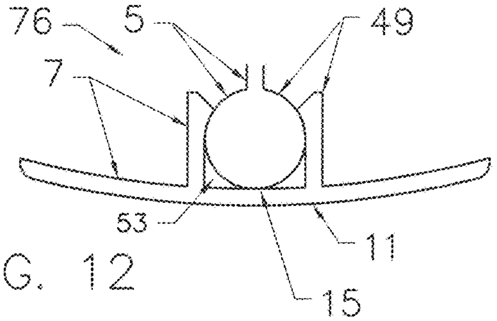
FIG. 12 is a cross-sectional view of another embodiment of a massage tool of the present invention having a rotating joint formed as a ball and socket joint on the proximal side of a body follower, taken nominally across section B-B of FIG. 7.

FIG. 12 is a cross-sectional view of another embodiment of a massage tool 76 of the present invention. The cross section is taken nominally across section B-B of FIG. 7 for ease of illustration. Massage tool 76 also has a rotating joint formed as a ball and socket joint 49 on the proximal side of a circular or oblong body follower 7. Massage tool 76 is simplified by providing a hollow void 53 in the socket portion of joint 49, without including a cushion or o-ring. This embodiment is suitable where certain plastic or elastomeric materials are used to form the joint 49.

Figure 13:
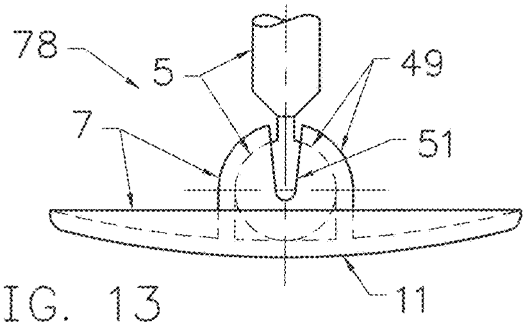
FIG. 13 is an elevation view of another embodiment of a massage tool according to the invention, having a socket formed as a spherical enclosure, with a rod slot formed in the socket.

FIG. 13 is an elevation view of another embodiment of a massage tool 78 according to the invention. Massage tool 78 features a ball and socket joint 49, wherein the socket portion is formed as a spherical enclosure having a rod slot 51 cut circumferentially along its centerline, as shown. The rod slot 51 allows the rod 5 to rotate further than the range of rotation provided by massage tools 10 or 70, as depicted in FIG. 1 and FIG. 9. With this alternate configuration, an operator using massage tool 78 can reduce the angle of the stroke axis with respect to the body contact area to about 10 degrees to provide a more gentle massage.

Figure 14:
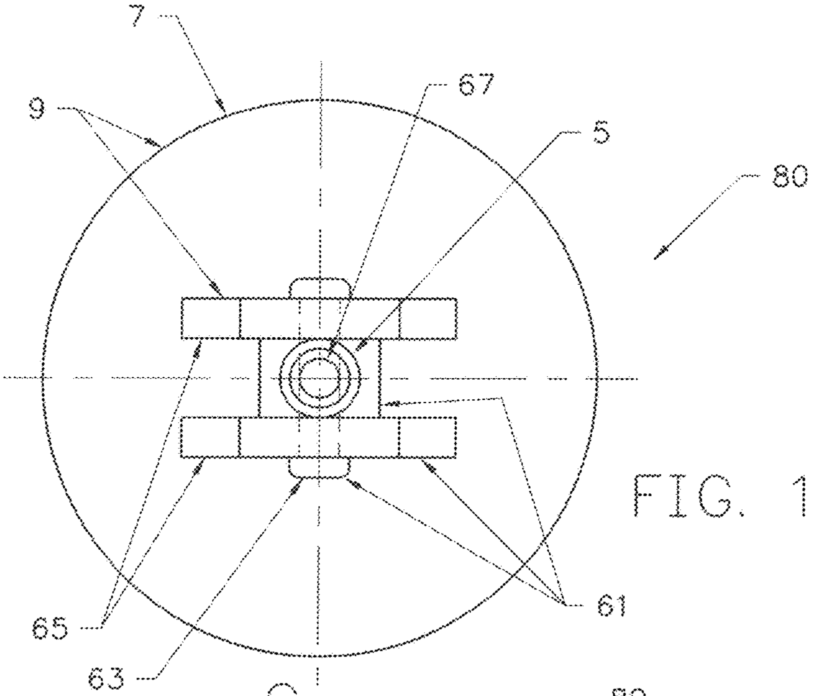
FIG. 14 is a top view of another embodiment of a massage tool according to the invention having a rotating joint formed as a hinge on the proximal side of a circular body follower.
Figure 15:
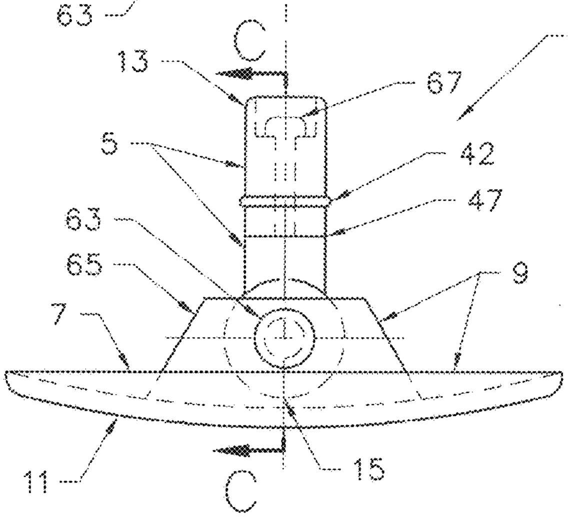
FIG. 15 is a side view of the massage tool of FIG. 14.
Figure 16:
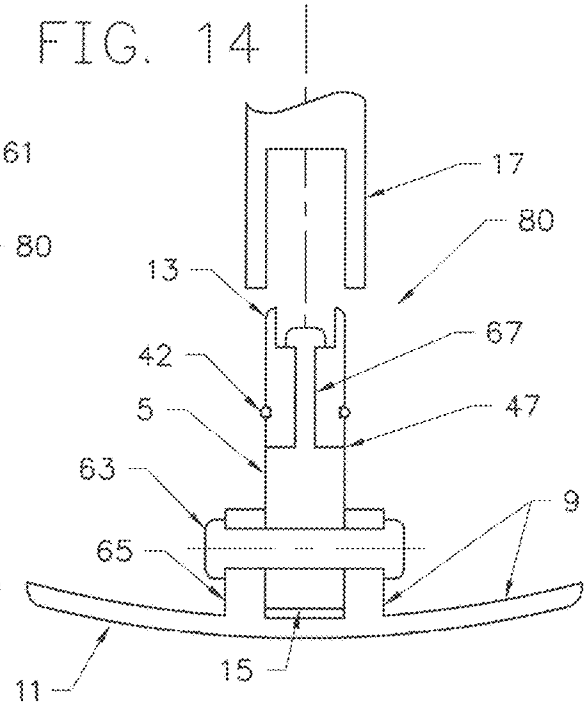
FIG. 16 is a partially exploded cross-sectional view of the massage tool taken along section C-C of FIG. 15.

FIGS. 14-16 show an embodiment of a massage tool 80 according to the invention that is characterized by a rotating joint having a swivel and hinge. FIG. 14 is a top view of massage tool 80, FIG. 15 is a side view thereof, and FIG. 16 is a partially exploded cross-sectional view thereof taken along section C-C of FIG. 15. The rotating joint of massage tool 80 has a hinge 61 formed on the proximal side 9 of a circular body follower 7. The body follower 7 has a dish-like shape, as the round section of a sphere, with rounded edges 44 formed on the distal side 11 and two hinge brackets 65 mounted on the proximal side 9. The distal end 15 of the rod 5 is cylindrical in form, with ends that fit between the hinge brackets 65 and that define a hole to accept a hinge pin 63. The proximal end 13 of the rod 5 has an o-ring 42 set into a groove similar to the arrangement shown in FIG. 4. The rod 5 is bifurcated and configured as a swivel 47 with a swivel retaining shaft 67. Action of the swivel 47 allows the body follower 7 to rotate around the axis of the rod 5, as the rod rotates about the hinge pin, so that an operator can translate the body follower against and along a contact area of a patient with six degrees of freedom.

Figure 17:
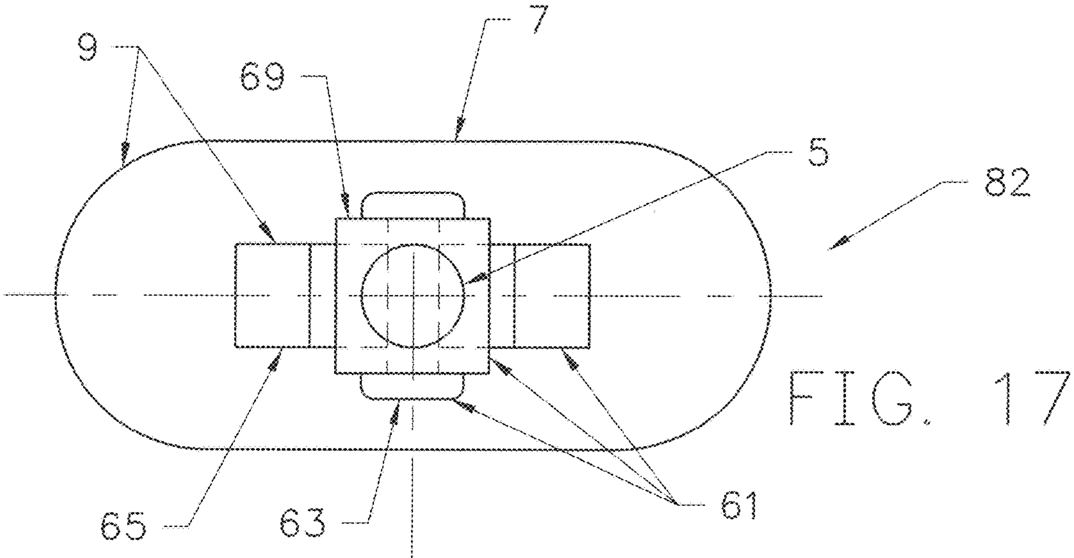
FIG. 17 is a top view of another embodiment of a massage tool according to the invention having a rotating joint formed as a hinge on the proximal side of an oblong body follower.
Figure 18:
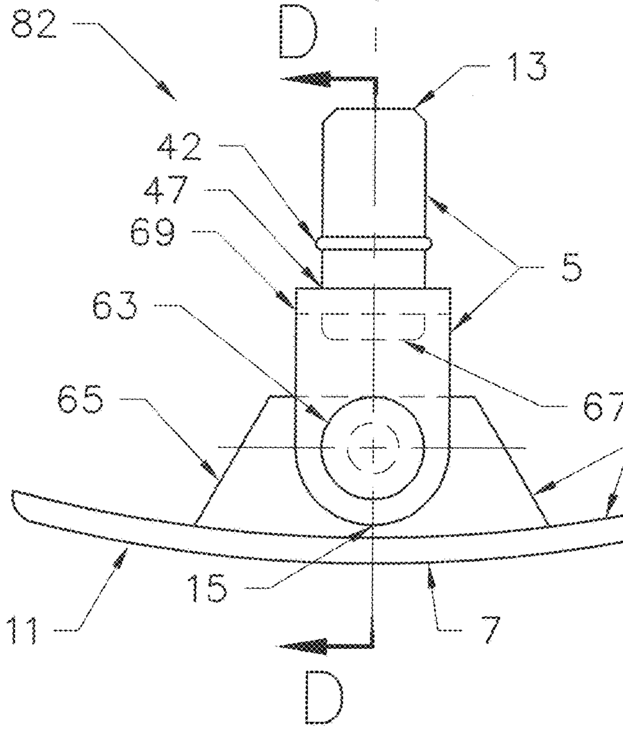
FIG. 18 is a side view of the massage tool of FIG. 17.
Figure 19:
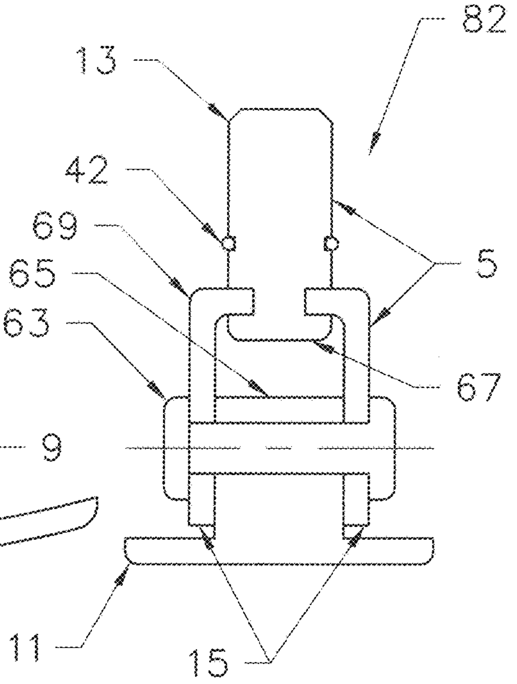
FIG. 19 is a cross-sectional view of the massage tool taken along section D-D of FIG. 18.

FIGS. 17-19 show an embodiment of a massage tool 82 according to the invention that is characterized as having a rotating joint in the form of a swivel and a hinge on the proximal side of an oblong body follower. FIG. 17 is a top view of massage tool 82, FIG. 18 is a side view thereof, and FIG. 19 is a cross-sectional view thereof taken along section D-D of FIG. 18. The proximal side of massage tool 82 includes a hinge 61 with a hinge pin 63 to form part of the rotating joint. The body follower 7 has the shape of an oblong section of a cylinder having rounded edges on the distal side 11 and a hinge bracket 65 formed on the proximal side 9. The distal end 15 of the rod 5 forms a yoke 69 having two ends fitting against each side of the hinge bracket 65 and a hole defined through all to accept the hinge pin 63. The proximal end 13 of the rod 5 has an o-ring 42 installed within a groove for connection in the manner previously shown in FIG. 4. The yoke 69 forms a distal portion of rod 5 and is connected to the proximal portion of rod 5 by a retaining swivel shaft 67. This arrangement allows the body follower to swivel by rotating about the axis of the rod while also rotating about hinge pin 63, to maintain the body contact area 27 of the body follower engaged with the contact area of the patient's body. In this embodiment, as best shown in FIG. 18, body follower 7 on its distal side 11 has a maximum length at least three times greater than a minimum distance from the center of rotation of the rotating joint to the distal side of the body follower 7. As shown in FIG. 19, the width of the distal side 11 may be less than three times the minimum distance from the center of rotation of the rotating joint to the distal side of the body follower, because the hinge 61 does not allow the body follower to rotate in the plain of rotation that is parallel to the width of distal side 11.

FIGS. 20-23 show an embodiment of a massage tool 84 according to the invention that is characterized by having a rotating joint formed as a universal joint on the proximal side of a body follower, and by having a body follower that is formed as an circular section of a sphere having rounded edges on its distal side. FIG. 20 is a top view of the proximal side of massage tool 84, FIG. 21 is a side view thereof, FIG. 22 is another side view thereof displaced by 90 degrees from the side view of FIG. 21, and FIG. 23 is an alternate side view thereof wherein the rod is rotated with the cross axle showing the rod partially rotated on both axes. On massage tool 84, the rotating joint is formed as a universal joint 71 having a hinge pin 63 and a cross axle 73. The body follower 7 has a dish-like shape, as a round or circular section of a sphere, with rounded edges on the distal side 11 and two hinge brackets 65 formed on the proximal side 9. The distal end 15 of the rod 5 includes a yoke 69 having two ends fitting against each side of the cross axle 73 and a hole defined through all to accept the hinge pin 63. The proximal end 13 of the rod 5 has an o-ring 42 installed within a groove cut into the rod 5 for connection as previously shown and described in FIG. 4. The universal joint of massage tool 84 allows an operator to move the body follower with six degrees of freedom, and in particular, to rotate the body follower about two orthogonal axes so that the body contact area 27 can remain aligned with the contact area of the patient's body as the body follower glides across varying contours of the patient's body. In one embodiment, beginning at the center of the distal side of the body follower and moving outward toward the perimeter, the contour of the body follower including the rounded edges curve in the proximal direction to provide easy translation across the patient's body and to avoid catching an edge or gouging the patient.

Figure 24:
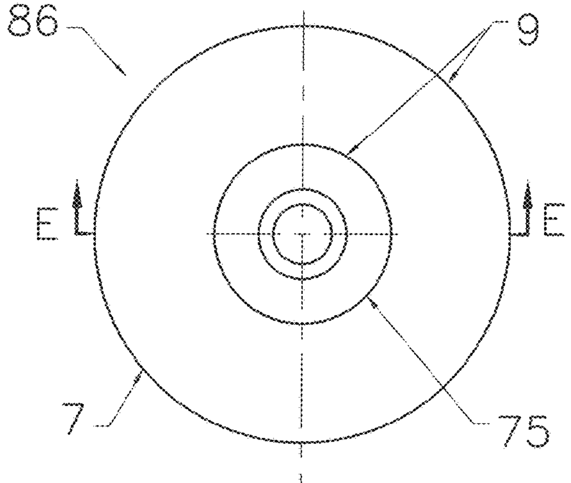
FIG. 24 is a top view of another embodiment of a massage tool according to the invention having a rotating joint formed as a flexure joint on the proximal side of a body follower that is formed as a round section of a sphere having rounded edges on its distal side.

FIG. 24 shows a top view of another embodiment according to the invention of a massage tool 86 having a rotating joint formed as a flexure joint 75 on the proximal side 9 of a body follower 7. The body follower 7 has a dish-like shape, formed as a round section of a sphere, having rounded edges on its distal side 11. Flexure joint 75 may comprise a flexure, or a flexible rod having a similar cross-sectional area as rod 5, and may be bonded, as shown, or fastened to the distal end 15 of the rod 5 and to the proximal side 9 of the body follower 7. The flexure joint allows the body follower 7 to rotate with respect to rod 5 and be translated along contours of the patient's body while the body contact area 27 remains engaged to the contact area of the patient's body.

Figure 25:
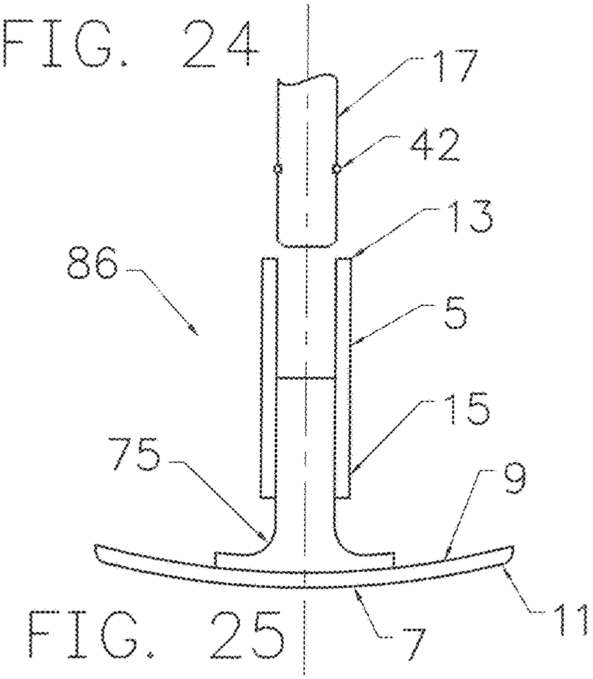
FIG. 25 is a cross-sectional view of the massage tool taken along section E-E of FIG. 24 and showing one implementation of the flexure joint.

FIG. 25 shows a cross-sectional view of massage tool 86 taken along section E-E of FIG. 24. This view shows the proximal end 13 of the rod 5 aligned for coupling to the male end of the reciprocating shaft 17. An o-ring 42 may be installed as described in previous embodiments to provide a friction fit between rod and shaft.

Figure 26:
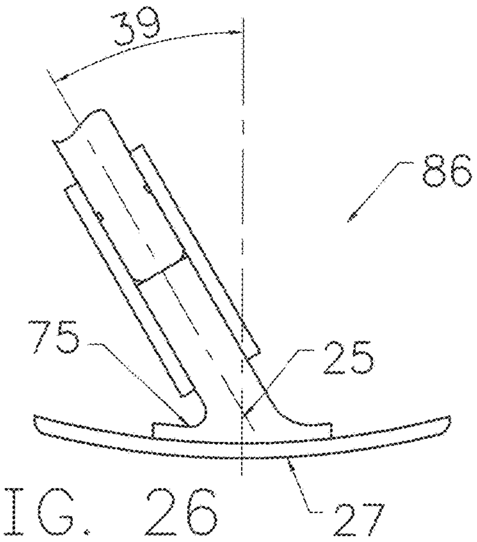
FIG. 26 is another cross-sectional view of the massage tool of FIG. 24, taken nominally along section E-E, showing the rod rotated off the vertical axis.

FIG. 26 shows another cross-sectional view of massage tool 86, taken nominally along section E-E for ease of illustration. This view shows the rod 5 rotated off the vertical axis. The rotation of the rod 5 is made possible by applying sufficient manual force to the flexible joint 75, which is formed from a material having sufficient strength and resilient flexibility to achieve an angle of deflection in a range between 0 degrees and about 30 degrees, or in other embodiments, between 0 degrees and about 45 degrees. The angle of deflection 39 of the rod 5 is with respect to the vertical line 25 that passes through an approximate center of rotation of the rod when the rod is in an undeflected state and oriented substantially perpendicular to the body contact area 27. When the manual force is removed, the flexure returns to its undeflected position.

Figure 27:
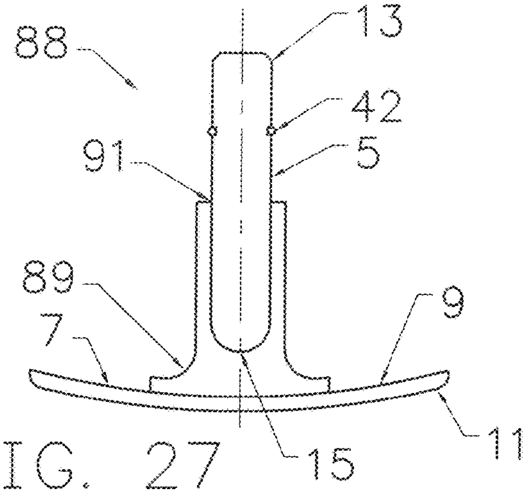
FIG. 27 is a cross-sectional view of the massage tool taken along section E-E of FIG. 24 and showing another implementation of the flexure joint.

FIG. 27 shows a cross-sectional view of an embodiment according to the invention of a massage tool 88. The cross-sectional view is taken nominally along section E-E of FIG. 24 for ease of illustration. Massage tool 88 provides another implementation of a flexible joint. In this case, the flexible joint is formed by mounting a specialized flexure 89 to the proximal side 9 of the body follower 7. Flexure 89 is formed from strong, resilient, flexible material and includes a receptacle 91 that is sized to accept and frictionally engage with the distal end of the rod 5. Flexure 89 may be bonded or fastened to, or formed integrally with, the proximal side 9 of the body follower. In one embodiment, flexure 89 includes a flexible portion and an inflexible portion. For example, the flexible portion may be located at the proximal end of the flexure, which the inflexible end may be located at the distal end of the flexure to provide a rigid base for coupling to the distal side of the body follower. In one embodiment, the flexible portion and inflexible portion are made from different materials. e.g. rubber and metal, respectively. In another embodiment, the material of flexure 89 is homogeneous, with flexible and inflexible portions determined by material thickness. The proximal end 13 of the rod 5 may have an o-ring 42 installed in a groove cut into the rod as shown and described in previous embodiments.

Figure 28:
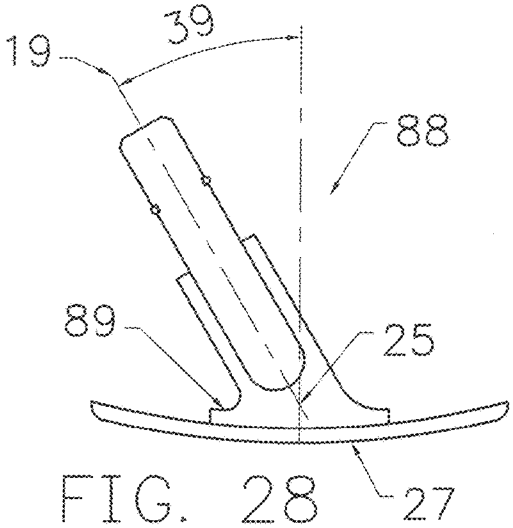
FIG. 28 is another cross-sectional view of the massage tool of FIG. 24, taken nominally along section E-E, showing the flexure joint implementation of FIG. 27 with the rod rotated off the vertical axis.

FIG. 28 shows a cross-sectional view of massage tool 88, showing the flexure joint implementation with the rod 5 rotated off the vertical axis. The cross-sectional view is taken nominally along section E-E of FIG. 24 for ease of illustration. This view shows a position of the rod 5, deflected off vertical by manual force, to form an angle 39 of about 30 degrees as shown between an axial line 19 running through the rod and a vertical line 25. In one embodiment, the massage tool 88 with flexure 89 is configured to allow angle 39 to span a range from about 0 degrees to about 30 degrees. In another embodiment, the angular range spans from 0 degrees to about 45 degrees. When the manual force is removed, flexure 89 will spring-return to its undeflected position represented by the vertical line 25 that passes through an approximate center of rotation and that is substantially perpendicular to the body contact area 27.

Figure 29:
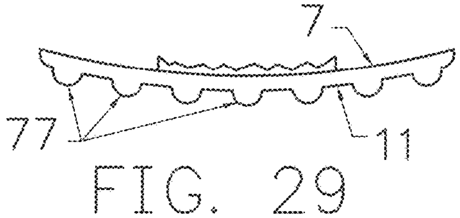
FIG. 29 is a magnified cross-sectional view of one embodiment of a massage tool according to the invention configured with a plurality of body contacting nubbins on the distal side of a body follower.
Figure 30:
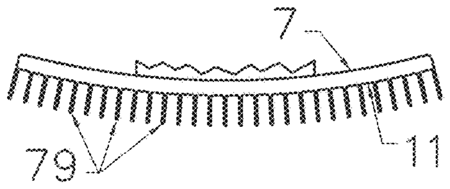
FIG. 30 is a magnified cross-sectional view of one embodiment of a massage tool according to the invention configured as a brush having flexible bristles on the distal side of a body follower.

FIGS. 29-30 show alternative embodiments for the configuration of the body contact area of a massage tool according to the invention. FIG. 29 is a magnified cross-sectional view of one such embodiment configured with a plurality of body contacting nubbins 77 formed on the distal side 11 of a body follower 7. Nubbins 77 extend generally perpendicularly from distal side 11, and may have rounded ends separated by a distance approximately equal to the length of nubbin protrusion. Other embodiments are possible in which the size and pattern of nubbins may vary. FIG. 30 is a magnified cross-sectional view of another such embodiment configured as a brush having flexible bristles displaced evenly along the curved surface of the distal side 11 of a body follower 7. Nubbins 77 and bristles 79 provide an operator with the ability to stimulate the muscles of a patient in different ways.

Figure 31:
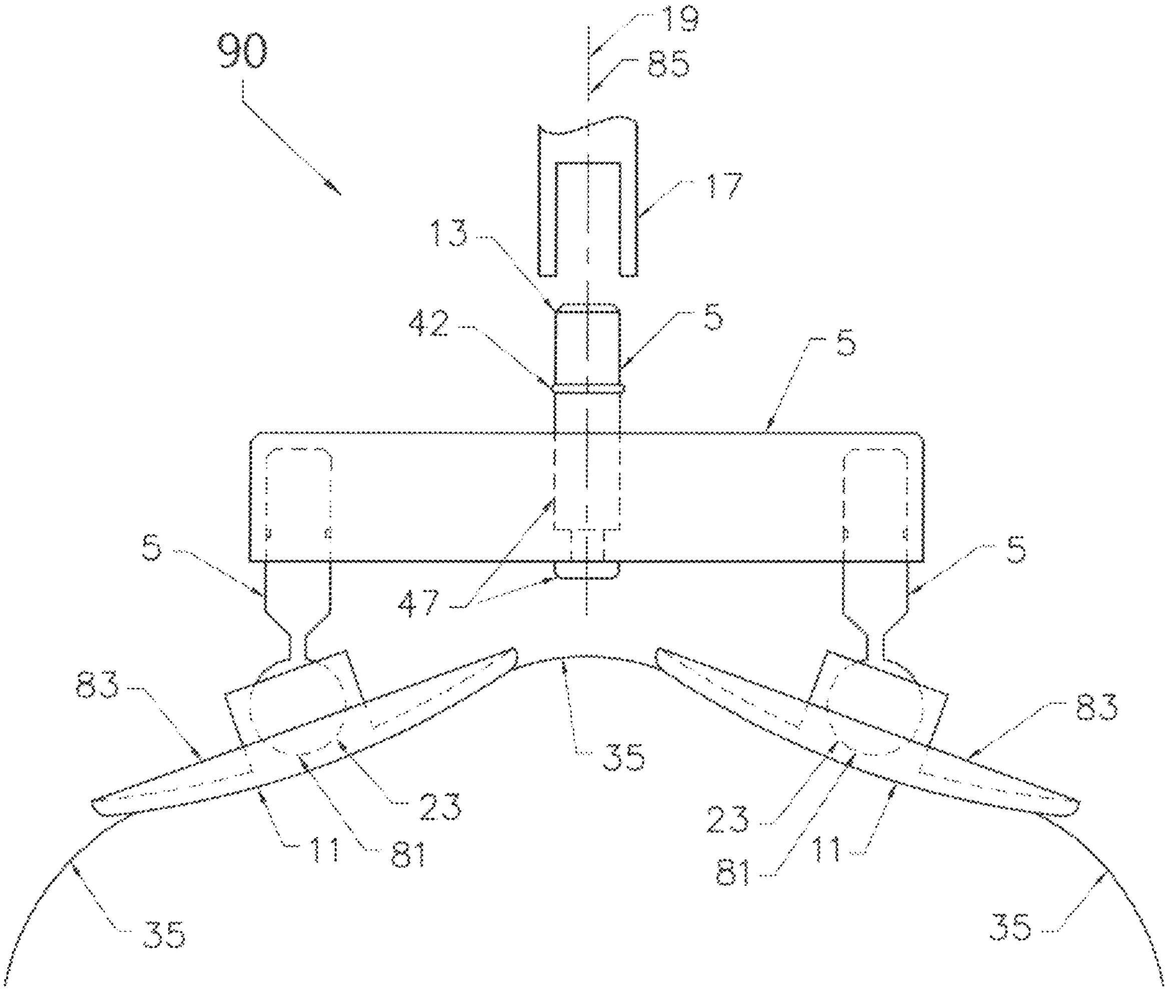
FIG. 31 is a side view of another embodiment of a massage tool according to the invention having a plurality of body followers.

FIG. 31 shows a side view of another embodiment according to the invention of a massage tool 90. Massage tool 90 is characterized as having a rod 5 configured for engagement to a reciprocating shaft 17, and having a plurality of distal ends 81 coupled to a respective plurality of body followers 83. The body followers 83 may be symmetrically disposed about a plane 85 passing through the stroke axis 19. A swivel 47 formed in the rod 5 allows the plurality of body followers 83 to rotate about the stroke axis. In this embodiment the proximal end 13 of the rod 5 is configured to be removably coupled to the reciprocating shaft 17, by means of a friction fit provided by an o-ring 42 installed in a groove cut into the rod as shown and described in previous embodiments herein. The body followers thus configured will independently remain in contact with, and aligned with a body surface 35, at multiple different contact areas, such as on a patient's thigh as shown in the figure. While tool 90 is depicted with two body followers 83, other embodiments having more than two body followers are possible within the scope of the invention. According to the invention, where multiple body followers are installed on a single massage tool, it is especially beneficial to construct the body contact areas 27 so that they curve in a proximal direction, as described in previous embodiments, to allow the tool be freely translated over irregular contours of the patient's body. Curvature of body followers in the opposite or distal direction, e.g., that mimic curvature of the patient's body, may cause a massage tool with multiple such body followers to mis-engage with or gouge the patient's skin as the tool is moved along the surface of the patient's body.

As for materials of construction, the major components of a massage tool 10 may be manufactured from stout materials such as certain metals, plastics, elastomers, and woods. For example, body followers may be formed from ABS plastic or synthetic rubber. Rods and balls may be machined from acetyl, nylon, or injection-moldable plastic, or may be formed from steel or aluminum. Branch arms may be machined from ABS plastic or acetyl bar stock. Smaller components such as connectors or fasteners between ball and rod, hinge pins, and swivel shafts may be machined from aluminum or steel. O-rings are preferably synthetic rubber such as neoprene or Viton™. Flexures may also be formed from a synthetic rubber, or from a thermoplastic such as polyurethane, or from a metal coil spring. Adapters needed for coupling the massage tool to jigsaws or other reciprocating motors may be machined from rugged materials, e.g., acetyl, steel, and aluminum. For mass production, a majority of the components may be manufactured from plastics, either by injection molding, heat-forming, or machining.

Stick-Slip Frictional Swivel Coupling for Coupling a Massage Tool to a Shaft being Reciprocated at a Forced Frequency Another embodiment of the invention provides a universal slip-stick frictional swivel coupling for removably coupling one or more massage tools to a reciprocating shaft of a reciprocating motor. The swivel coupling is a combination thrust and journal bearing that allows a massage tool to swivel on a swivel axis closely parallel to a stroke axis of the reciprocating shaft to align advantageously and remain in contact with a body surface of a patient. The reciprocating motor may be a handheld motor of a general size and form as those used for power jigsaws or for known hand-held reciprocating power massage tools. The reciprocating motor having a reciprocating stroke imparts to the massage tool an advancing stroke toward the body surface and then a retracting stroke away from the body surface. The extremes of the reciprocating stroke define a stroke length and a stroke axis. The swivel coupling may be used to couple swiveling or non-swiveling massage tools to the reciprocating shaft. When properly operated by a therapist, a massage tool that has the swivel coupling in combination with the reciprocating shaft and swiveling or body following massage tools mimics the articulated action of tapotement style massage while also providing the power, stroke and speed of the reciprocating motor. A swiveling massage tool shaped to swivel allows the operator 33 (FIG. 1) to guide the tool around the body surface by varying the force applied and the angle of the stroke axis to the body surface.

Figure 32:
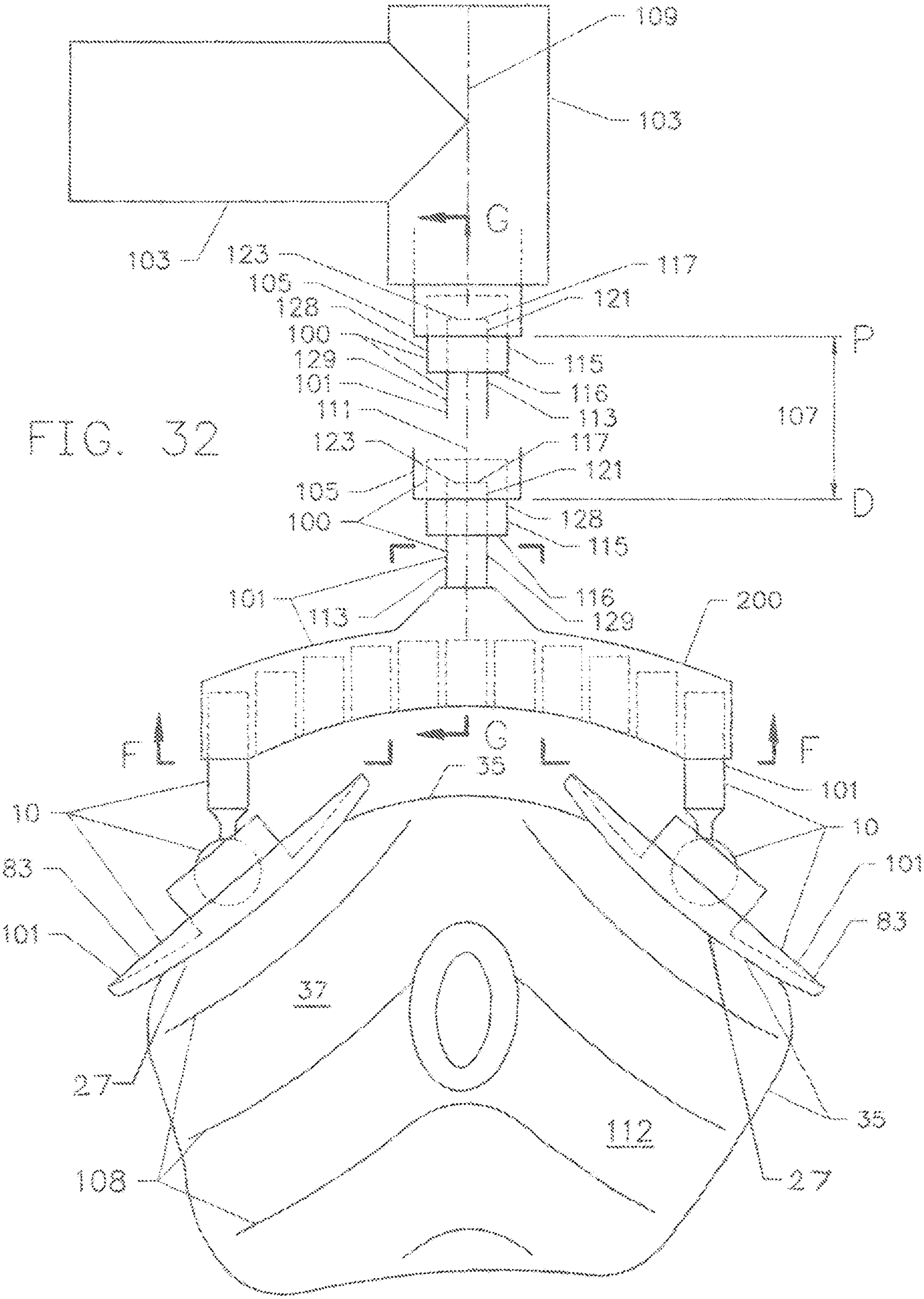
FIG. 32 is a side view of one embodiment according to the invention of a reciprocating motor with an adapter and swivel coupling connecting a massage tool having a plurality of body followers providing tapotemental therapy.

FIG. 32 shows a side view of one embodiment according to the invention of a swivel coupling 100 for a tapotemental massage tool 101. The tapotemental massage tool 101 is coupled to a reciprocating shaft 105 of a reciprocating motor 103 by the swivel coupling 100. The swivel coupling 100 comprises a thrust journal 113 that swivels in a cup 115. The reciprocating motor 103 is configured to translate the reciprocating shaft 105 back and forth a stroke length 107 along a stroke axis 109. For illustrative purposes, stroke length 107 as it appears in the figure is shown longer than is common for most reciprocating motors. The figure illustrates a proximal P and a distal D extremes of the stroke length 107. The reciprocating motor 103 is shown at its proximal extreme position P during the stroke. The reciprocating shaft 105 and the swivel coupling 100 are shown at both the proximal P and the distal D extreme positions. The massage tool 101 is shown affixed to the swivel coupling 100 at the distal extreme position D of the stroke. During each tapotement stroke of the reciprocating motor 103, both the motor and the massage tool 101 move in opposite directions. Other embodiments of massage tool 101 are shown in subsequent figures. The massage tool 101 in the figure illustrates one embodiment of a tool beam 200 as further discussed below. Shown secondarily coupled to the tool beam 200 are two embodiments of massage tool 10 (FIG. 1) or body followers 83 (FIG. 31) each having a body contact area 27. The swivel coupling 100 allows the massage tool 101 to swivel so that both body followers remain in contact with the body surface 35 focusing tapotemental pulsations 108 from different directions through body members such as a thigh 112. The embodiment of massage tool 101 shown in FIG. 32 coupled to the reciprocating motor by the swivel coupling 100 can be applied and guided by the operator around or along the thigh 112 and to other locations on the patient's body 37 while maintaining contact within the context of tapotement. Massage tool 101 shown in FIG. 32 having a plurality of body contact areas 27 is one embodiment of a swiveling tool and of the swiveling tool beam.

Figure 33:
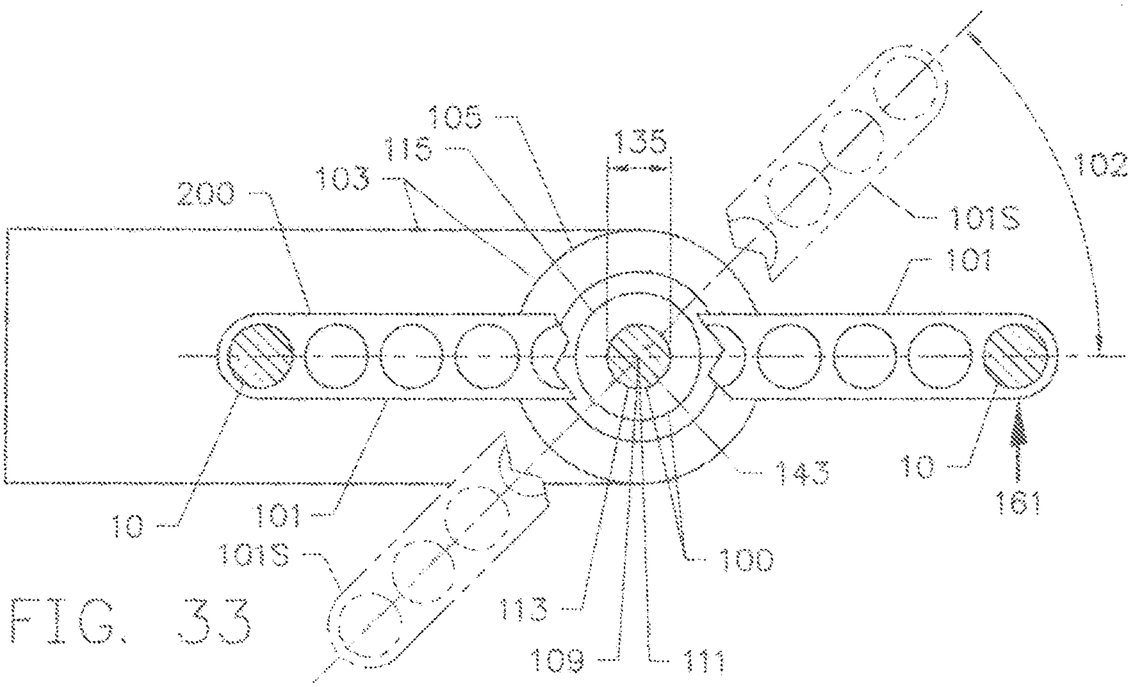
FIG. 33 is a cross-sectional view taken along section F-F of FIG. 32 showing the massage tool swiveling about the stroke axis and swivel axis while coupled to the reciprocating motor.

FIG. 33 is a cross-sectional view taken along section F-F of FIG. 32 through massage tool 101. Shown beyond the section cut line is the cup 115 of swivel coupling 100, the reciprocating shaft 105 and the reciprocating motor 103. The figure shows massage tool 101 as positioned in FIG. 32, and also as positioned in a swiveled position 101S. The swivel coupling 100 having a coupling diameter 135 allows the massage tool 101 to swivel fully around a swivel axis 111 that is closely aligned with the stroke axis 109. During therapeutic use on body surfaces 35 (FIG. 1 and FIG. 32) the massage tool 101 may rock back and forth at a swiveling angle 102 that may be less than a few degrees to as much as is needed to maintain full contact of the massage tool 101 with the body surface. The embodiment shown in FIG. 32 hugs body parts so the therapist may provide continuous contact therapy from neck to foot without changing tools. A therapist may employ the full rotation of the swivel coupling 100 to best align his hands and the massage tool to provide therapy or to change to a different embodiment of massage tool 101.

Figure 34:
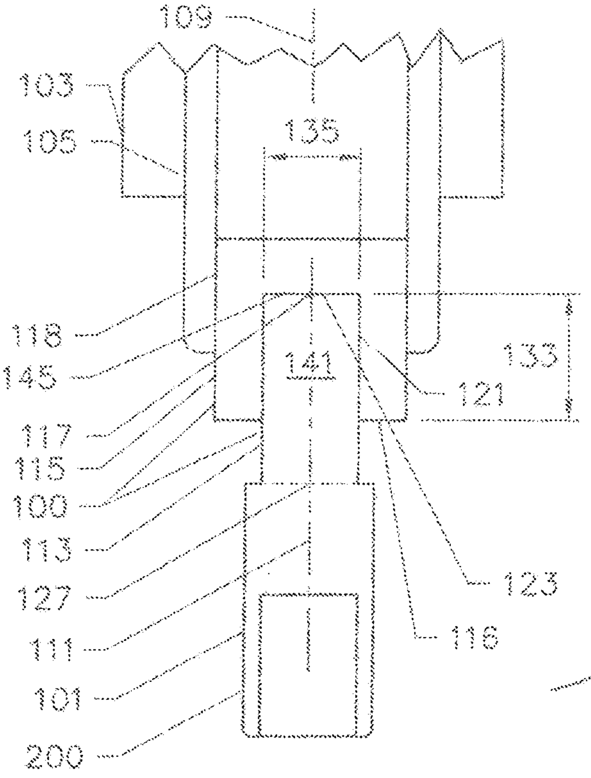
FIG. 34 is a cross-sectional view taken along section G-G of FIG. 32.

FIG. 34 is a cross-sectional view taken along section G-G of FIG. 32 showing another embodiment of the swivel coupling 100. This embodiment includes a cylindrical thrust journal 113 forceable by hand into the cup 115 to make an engagement that couples massage tool 101 to the reciprocating shaft 105 of the reciprocating motor 103. The cup 115 is also cylindrical, having the coupling diameter 135, a swivel bearing 121, a thrust bearing 117, a rim 116, and a swivel bearing length 133. The cylindrical thrust journal 113 has the coupling diameter 135 and a thrust end 123. When fully engaged within the cup 115 the thrust end 123 abuts the thrust bearing 117 of the cup 115 and the thrust journal 113 extends beyond the rim 116 to an attachment end 127 affixed to tool beam 200. The figure shows an embodiment according to the invention wherein the cup 115 is also configured as a removable adapter 118 coupled to the reciprocating shaft 105. In another embodiment the cup 115 shown in FIG. 34 is permanently affixed to or configured as a part of the reciprocating shaft 105.

Figure 35:
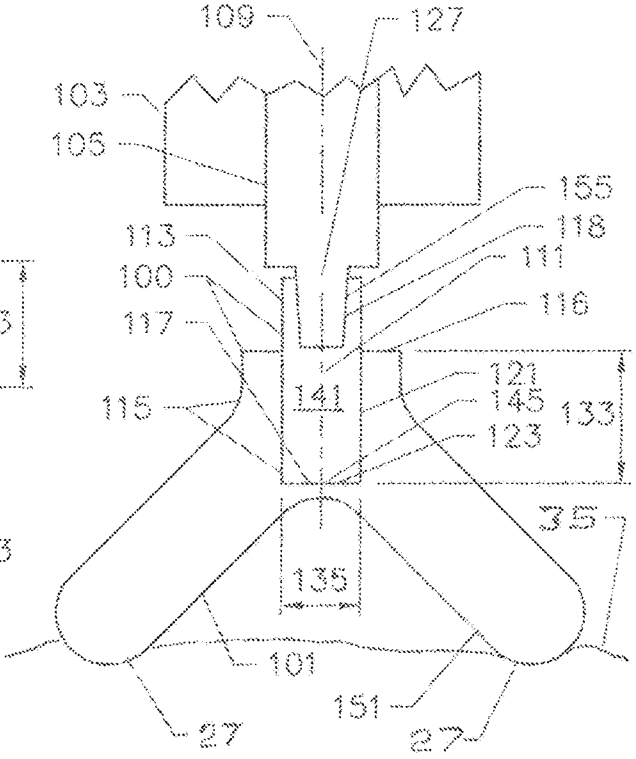
FIG. 35 is a cross-sectional view taken along section G-G of FIG. 32 of another embodiment according to the invention of a swivel coupling for a forked tapotemental massage tool coupled to a reciprocating motor.

FIG. 35 is a cross-sectional view taken along section G-G of FIG. 32 showing another embodiment of swivel coupling 100. In this embodiment the attachment end 127 of the thrust journal 113 is an adapter 118 attached rigidly by tapered friction joint 155 to the reciprocating shaft 105. The cup 115 in this embodiment is formed within the massage tool 101. The massage tool 101 shown in FIG. 35 is a rigid fork shaped tool 151 having two body contact areas 27 that remain aligned with the body surface 35 causing the tool 151 to swivel on the thrust journal 113 about the swivel axis 111. In another embodiment similar to FIG. 35 the thrust journal 113 may be formed as an extension of the reciprocating shaft 105, without an adapter 118.

Figure 36:
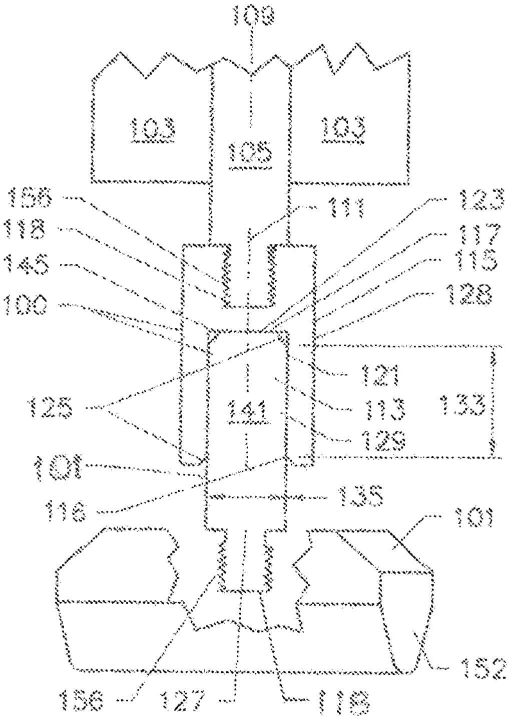
FIG. 36 is a cross-sectional view taken along section G-G of FIG. 32 of another embodiment according to the invention of a swivel coupling for a chisel shaped tapotemental massage tool coupled to a reciprocating motor.

FIG. 36 is a cross-sectional view taken along section G-G of FIG. 32 showing another embodiment according to the invention of a swiveling tool. In this embodiment, the cup 115 of swivel coupling 100 is configured an adapter 118 attached rigidly by threaded joint 156 to the reciprocating shaft 105. FIG. 36 also shows the attachment end 127 of the thrust journal 113 as another adapter 118 attached rigidly to massage tool 101 by tightened threaded joint 156. The embodiment of the massage tool 101 shown here is a chisel shaped tool 152 rotated about 45 degrees away from section G-G to reveal the chisel shape. The chisel shaped tool 152 is a rigid swiveling tool having a long narrow body contact area that remains aligned with the body surface causing it to rock or swivel on the swivel axis 111 of swivel coupling 100. This embodiment of massage tool 101 shown in FIG. 36 with the attached thrust journal 113 may be configured to insert into the embodiment of cup 115 shown in FIG. 32 and FIG. 34. In the embodiment of swivel coupling 100 shown in FIG. 36 the thrust journal 113 and the distal end of the swivel bearing 121 each have a conical chamfer 125 that may assist in inserting the thrust journal 113 into the cup 115. The conical chamfer 125 of thrust journal 113 may reduce frictional swiveling resistance of the thrust end 123 bearing against the thrust bearing 117. However, the chamfers 125 effectively reduce the swivel bearing length 133. Other embodiments may include the chamfer 125 only on the thrust journal 113 or only on the cup 115.

Figure 37:
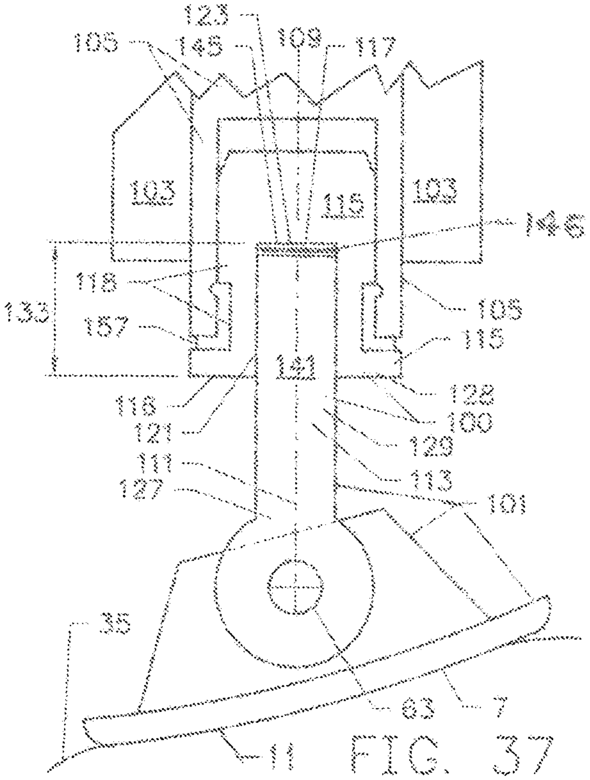
FIG. 37 is a cross-sectional view taken along section G-G of FIG. 32 of another embodiment according to the invention of a swivel coupling for a hinged body following tapotemental massage tool coupled to a reciprocating motor.

FIG. 37 is a cross-sectional view taken along section G-G of FIG. 32 of another embodiment according to the invention of swivel coupling 100 and massage tool 101. In this embodiment, the cup 115 is configured as an adapter 118 that couples to the reciprocating shaft 105 using a flanged friction collar 157 made of rubber or another similar elastomer. The embodiment of massage tool 101 shown in FIG. 37 is a body follower 7 that rocks on a hinge 63 to remain in contact with the body surface 35. This embodiment of massage tool 101 is a swiveling tool that is similar to massage tool 80 shown in FIGS. 14-16 and massage tool 82 show in FIGS. 17-19. As the operator angles the stroke axis 109 guiding the body follower 7 along the body surface 35 the massage tool 101 will swivel or rock on the swivel axis 111 causing the hinge 63 and the body follower 7 to remain in contact and substantially parallel with the body surface 35.

In view of the foregoing embodiments that describe swivel coupling 100, it should be understood that FIG. 1 shows a basic embodiment of a swivel coupling according to the invention. In the basic embodiment, the cup is formed within the reciprocating shaft 17 into which is fit the rod 5 that is the thrust journal. The distal end of the rod 13 is the thrust end that abuts the thrust bearing at the bottom of the cup.

FIG. 32 through FIG. 37 and FIG. 41 through FIG. 43 show various embodiments of the swivel coupling according to the invention. In its most basic form, the swivel coupling 100 comprises two parts: a thrust journal 113 and a cup 115. The cup 115 has a rim 116 that surrounds an opening configured to receive the thrust journal 113. The thrust journal 113 is dynamically joined to the interior wall of the cup 115 by stick-slip frictional fit thereto. The interior wall of the cup 115 forms a swivel bearing 121, in which the thrust journal 113 may swivel about a swivel axis 111 against the force of frictional swiveling resistance. The swivel axis 111 is closely aligned with the stroke axis 109. The swivel coupling 100 is fully engaged when the thrust end 123 of the thrust journal 113 abuts the thrust bearing 117 formed at the closed end of the cup 115. When fully engaged the swivel coupling 100 transmits the advancing stroke of the reciprocating shaft 105 to the massage tool 101 then withdraws the massage tool 101 with the retracting stroke. With each stroke axial or swiveling, slip may occur between the thrust journal 113 and swivel bearing 121. This slip is caused by rapidly reversing acceleration of the mass of the massage tool 101, by rebound of the thrust end against the thrust bearing, and by fluctuating forces acting between the contact surface 27 and the body surface 35.

The cup 115 may be attached or coupled to the reciprocating shaft 105, and the attachment end 127 of the thrust journal 113 may be attached to the massage tool 101. In an alternative embodiment, the attachment end 127 of the thrust journal 113 may be attached or coupled to the reciprocating shaft 105 and the cup 115 attached the massage tool 101. Embodiments of an adapter 118 may attach the thrust journal 113 or the cup 115 to the reciprocating shaft 105 or to the massage tool 101. Adapters may provide removability or permanent attachment. Embodiments of the adapter 118 may include attachment of the swivel coupling 100 to reciprocating shafts 105, to massage tools 101, and to other massage tools not configured to swivel.

Massage tools not configured to swivel may include pointed tools, spherical tools, hemispherical tools 154 (FIG. 39), conical tools, round tools, small tools, tools not shaped to swivel and tools not needing to swivel for therapeutic use.

In other applications, the swivel coupling 100 may couple to the reciprocating shaft 105 massage tools that achieve a swivel function without reliance on the swivel coupling 100, such as the ball and socket massage tool shown in FIG. 7 through FIG. 13, or tools having a swivel joint as shown in FIG. 14 through FIG. 19 and in FIG. 31. These massage tools can be coupled to the reciprocating shaft 105 by the swivel coupling 100 but may swivel by other means.

The swivel coupling 100 may be used to couple the reciprocating shaft 105 to a swiveling tool embodiment of massage tool 101 configured to cause the swivel coupling 100 to swivel when the surface area 27 the massage tool 101 reciprocates against the body surface 35. The swiveling tool so coupled may be a rigid tool that includes a fork shape 151 (FIG. 35), a chisel shape 152 (FIG. 36), a curved chisel shape or another shape that tends to swivel to align with the body surface. A shape tending to swivel may often include a body surface contact area that is long and thin. In one swiveling tool embodiment, the massage tool 101 that is coupled may be a body follower 7 on a hinge 63 as in FIGS. 17-19 and 37, wherein the hinge 63 causes the tool to swivel and to remain parallel with the body surface 35 against which it reciprocates. In another swiveling tool embodiment, the massage tool 101 coupled to the reciprocating motor 103 may be a swiveling tool beam 200 having a plurality of secondary tools or a rod having a plurality of distal sides 11 (FIG. 31) that cause the swivel coupling 100 to swivel due to the direction, angle, lever arm, and magnitude of force applied by the operator to keep the plurality of secondary tools in contact with the body surface 35.

Figure 40:
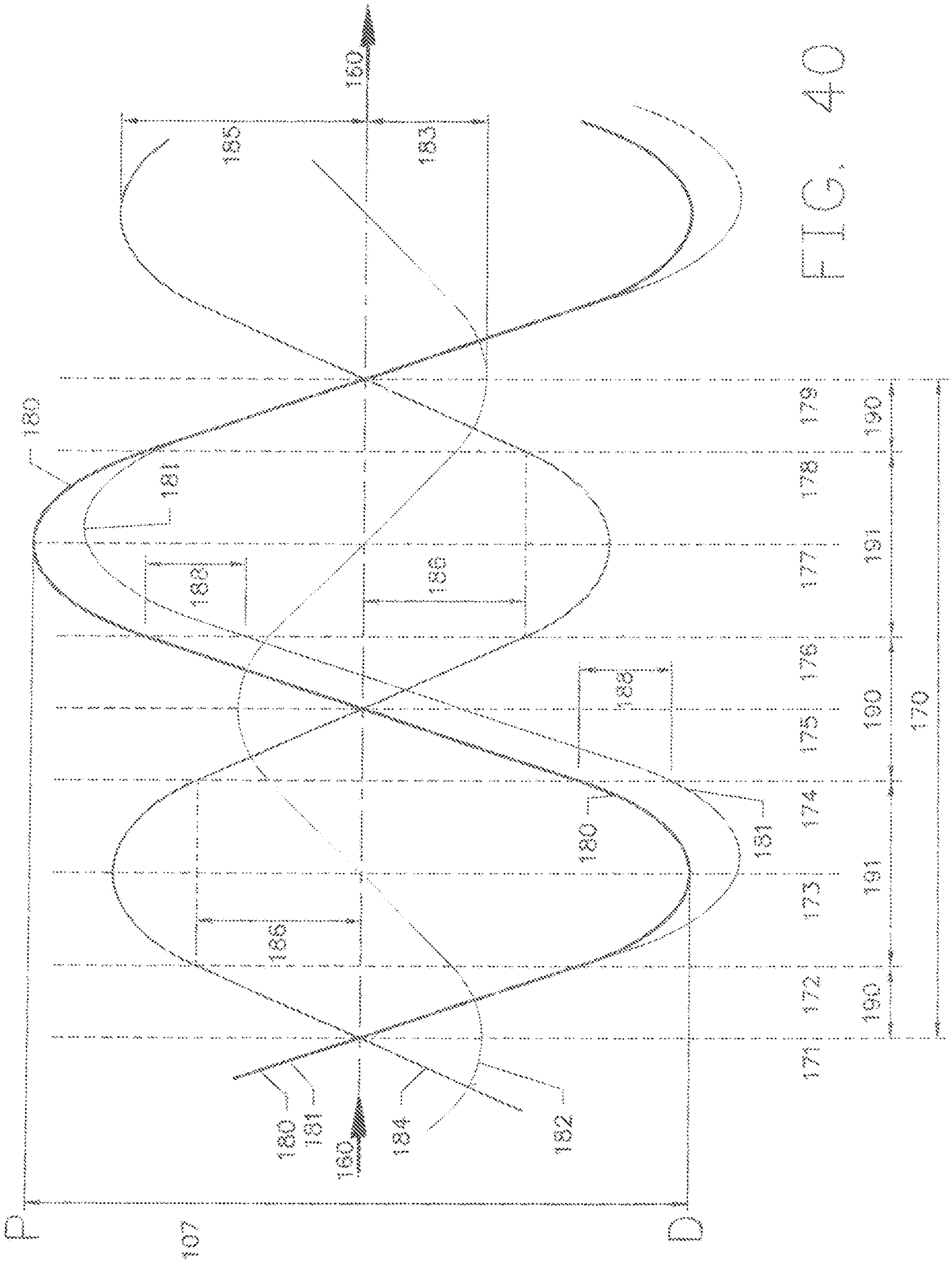
FIG. 40 is a graph illustrating stick-slip friction dynamics of time versus position, velocity, acceleration, and slip of the two coupling halves—a cup and thrust journal—of a swivel coupling assembly of the present invention as it is reciprocated at a forced frequency through one complete stroke.

When the swivel coupling 100 is fully engaged, the thrust end 123 of the thrust journal 113 bears against and may swivel on the thrust bearing 117 of the cup 115, thereby transmitting the advancing stroke and percussive massaging force to the patient's body surface 35. When the massage tool 101 is reciprocating against the body surface 35 engagement of the swivel coupling is maintained by force applied by the operator pressing the thrust journal into the cup 115. The swivel coupling 100 must also remain engaged when the massaging system is operated in a "contactless mode"—that is, when the reciprocating motor 103 is operating but the massage tool 101 is not contacting the patient's body surface 35. In the contactless mode, the reciprocating motor 103 acting through the swivel coupling 100 on the mass of the massage tool 101 generates an acceleration force that may tend to disengage the coupling. As shown in FIG. 40 and further discussed below this acceleration force created by the reciprocating motor 103 is 90 degrees out of phase with the velocity of the stroke and 180 degrees out of phase with the displacement position of the reciprocating shaft 105.

The swivel coupling is often in tension when the operator 33 is repositioning or translating the massage tool 101 back and forth on the body surface 35. Direct tension along the swivel axis will disengage the swivel coupling 100 and is used to change massage tools 101. A static frictional resistance must be exceeded to engage and disengage the swivel coupling 100 to change tools. The static frictional resistance needs to significantly exceed the weight of the massage tool 101 yet be easily removable by hand without any damage to the massage system.

To maintain engagement of the swivel coupling 100, the thrust journal 113 and cup 115 are preferably configured as a mated pair of stick-slip frictionally fit cylinders that may include an o-ring or other frictional elements. The stick-slip frictional fit must provide sufficient frictional resistance between the thrust journal 113 and the swivel bearing 121 to maintain engagement of the thrust journal 113 within the cup 115, while allowing the thrust journal 113 to be inserted and withdrawn by hand, and while allowing the massage tool 101 to swivel when operating against the body surface 35.

The stick-slip frictional fit of the thrust journal 113 into the cup 115 is specific to materials of construction, size and mass of the massage tool 101, and to the acceleration of the reciprocating shaft 103. The cup 115 and thrust journal 113 ideally are smooth and true right circular cylinders that slide easily against each other. During massage, the swivel coupling 100 swivels only through small arcs and has minimal axial movement so there is relatively little wear and heat from friction. This allows construction of the swivel coupling 100 from a variety of materials. For example, the components of the coupling 100 may be made from a material that is rigid but slightly resilient, such as an elastic plastic, or an injection moldable thermoplastic. In some embodiments, the coupling 100 may be made from nylon, Delrin®, acetal, PVC, UHMW, polyethylene, polypropylene, ABS, polystyrene, acetate, polycarbonate, polyamides, polysulfone, polyphenylene, PTFE phenolics, and laminated phenolics, including bearing and journal coatings or bushings. In other embodiments, components of the coupling 100 may be made from metal combined with plastic, o-rings and lubrication. Newer and possibly more suitable materials are continuously being discovered and invented, and may be used to construct different components of a swivel coupling without departing from the scope of the invention.

The stick-slip frictional fit maintaining engagement may ideally include radial pressure fully about a circumference of the thrust journal 113 inside the cup 115 along the entire length of the swivel bearing 121. In some embodiments the stick-slip fit is an interference fit. Certain embodiments may include the cup 115 and thrust journal 113 being of metal or plastic or a combination of both. Certain other embodiments may include a reduced diameter section or sections in the thrust journal 113 along the swivel bearing 121, or mating diameter steps in the swivel bearing 121 and thrust journal 113. Some embodiments may be made with less elastic materials such as most metals. Some embodiments may include a clearance between the swivel bearing 121 and the thrust journal 113 and use o-rings or other types of rings or frictional elements to provide sufficient friction to maintain engagement of the swivel coupling 100.

In a simplified embodiment of the swivel coupling 100 shown in FIGS. 32, 34, 35, 37 and 38, the thrust journal 113 has a smooth thrust end 123 that comprises a plane perpendicular to the swivel axis 111. When coupled the thrust end 123 bears and swivels with minimal frictional swiveling resistance against the mating smooth thrust bearing 117 of the cup 115. In this embodiment the swivel bearing length 133 extends to the full depth of the cup 115. In other embodiments the thrust end 123, the thrust bearing or rim 116 may have a chamfer 125 (FIG. 36) forming a truncated conical surface or a filleted corner to facilitate insertion during assembly and to reduce swiveling resistance from thrust end friction. As shown in FIG. 36 the swivel bearing length 133 is the length of the thrust journal 113 within the cup that contacts the swivel bearing 121. Other embodiments may include mating hemispherical or conical shaped thrust ends 123 and mating or partially mating thrust bearings 117. Mating thrust ends 123 may be concave or convex shapes. Generally sliding thrust surfaces of the thrust end 123 and the thrust bearing 117 are shaped as a solid of revolution about the swivel axis. The mating fit of the thrust end 123 with the thrust bearing 117 is configured to provide sufficient contact area to compressively transmit the advancing percussive stroke and force of the reciprocating motor 103 while generating minimal friction when the thrust journal 113 swivels in the cup 115.

The swivel coupling 100, having sufficient friction to maintain engagement, will swivel when a sufficient swiveling torque is created about the swivel axis 111 between the reciprocating motor 103 and the massage tool 101. The swiveling torque is generated by the operator forcing the reciprocating massage tool 101 against and along changes in the body surface 35; imparting greater force on one side of the massage tool relative to an opposing side of the massage tool. The swiveling torque is thereby created about the swivel axis 111. Force creating the swiveling torque increases as the operator directs the massage tool 101 so that the angle 39 (FIG. 1) of the stroke axis 19 (FIG. 1) and 109 (FIG. 32) is greater and further from perpendicular to the body surface 35. A swiveling force 161 shown in FIG. 33 is a resultant component of an imbalance in forces acting between the body surface and the massage tool. The swiveling force 161 acts perpendicular and eccentric to the swivel axis 111, creating the swiveling torque. When the swiveling torque exceeds a frictional swiveling resistance of the swivel coupling 100, the massage tool 101 will swivel to maintain its alignment with the body surface. The frictional swiveling resistance includes frictional resistance of the thrust end 123 swiveling against the thrust bearing 117 and frictional resistance of the thrust journal 113 swiveling within the swivel bearing 121.

Figure 38:
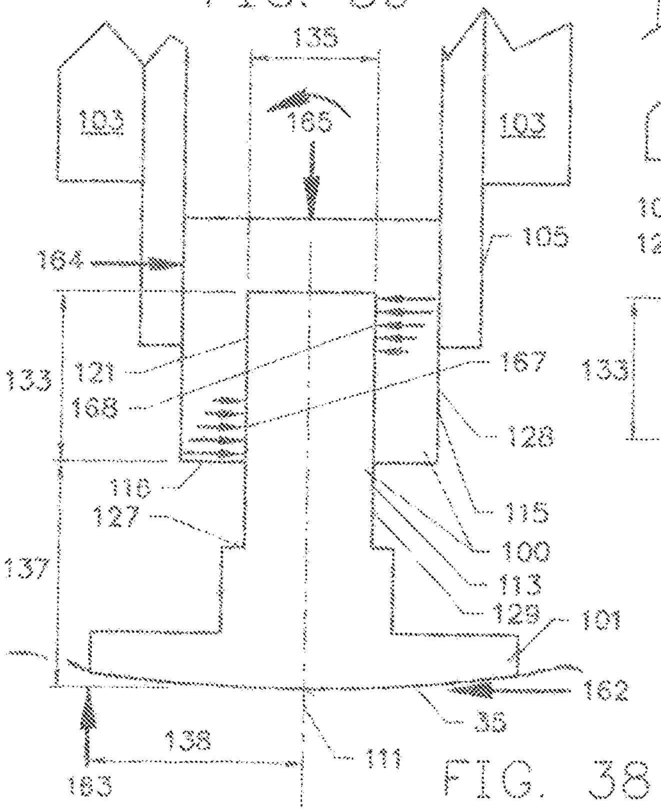
FIG. 38 is a free body diagram taken along section G-G of FIG. 32 of another embodiment of a swivel coupling of the present invention showing a cup attached to the reciprocating shaft and a thrust journal attached to a body contacting shape, and also showing various forces acting between the massage tool and the reciprocating motor through the swivel coupling.

FIG. 38 shows a general free body diagram as a cross-sectional view of one embodiment of a swivel coupling 100 of the present invention. The view is taken along section G-G of FIG. 32. Swivel coupling 100 comprises two coupling halves, a cup 115 and thrust journal 113, one coupling half is attached to the reciprocating shaft 105, and the other coupling half is attached to and part of a massage tool 101. In the embodiment shown in FIG. 38 the cup 115 is attached to the reciprocating shaft 105. Fluctuating forces and reactions acting between the reciprocating shaft 105 and the massage tool 101 that are not aligned with and centered on the swivel axis 111 cause bending and shear that act between the thrust journal 113 and the cup 115. A force component 162 of these forces and reactions may act perpendicular to the swivel axis near the distal end of the massage tool 101. Another force component 163 of the forces and reactions may act parallel the swivel axis 111 at a radial distance 138 from the swivel axis 111. Balancing the free body diagram are force components 164 and 165, and a bending moment 166 acting between the cup 115 and the reciprocating shaft 105, opposing the forces 162 and 163 acting on the massage tool. Some bending moment in the thrust journal 113 is created by force 162 acting on a lever arm length 137 from the body contact area 27. Additional bending moment may be created by a force 163 acting on a length 138. Some bending moment in the thrust journal 113 is created by force 162 acting on a lever arm length 137 from the body contact area 27. Additional bending moment may be created by a force 163 acting on a length 138. Bending of the swivel coupling 100 by the balanced opposing force components is transmitted between the thrust journal 113 and the swivel bearing 121 as opposing ramped stress 167 and 168. The stress is concentrated at opposite ends of the swivel bearing 121 and acts between the thrust journal 113 and the swivel bearing 121. The magnitude of bending, force and stress produced is inversely proportional to the length 133 of the swivel bearing. A longer swivel bearing produces less bending stress 167 and 168.

FIG. 38 depicts a maximum bending condition to illustrate the effect of bending within the swivel coupling. Bending of the swivel coupling 100 along its axis 111 is a significant source of swiveling resistance. Bending of the thrust journal 113 within the swivel bearing 121 may momentarily prevent the swivel coupling 100 from swiveling. However, forces acting between the massage tool 101 and the reciprocating shaft 105 are continuously changing with the reciprocating stroke, with direction and magnitude of force applied by the operator and with reaction forces and harmonics acting between the massage tool 101 and the body surface 35. The swiveling resistance caused by these forces is continuously changing and reversing with the reciprocating stroke from a maximum to a minimum near zero.

Likewise, forces creating the swiveling torque similarly fluctuate. When for occasional instances during the stroke the swiveling torque exceeds the swiveling resistance the swivel coupling 100 will swivel infinitesimally. During therapy, swiveling of the swivel coupling 100 and the massage tool 101 occurs in a series of small steps corresponding to strokes of the reciprocating motor 103.

To maintain engagement of (retain) the swivel coupling 100 the friction of the thrust journal 113 in the swivel bearing 121 must be sufficient to resist linear sliding of the thrust journal 113 from the cup 115 when the massage tool 101 may be briefly in tension during massage of the body surface 35, or when reciprocating freely in the air in the contactless mode. Frictional force acting between the swivel bearing 121 and the thrust journal 113 creates a frictional resistance parallel to the swivel axis 111 that tends to maintain engagement of the swivel coupling 100. The same frictional resistance must be exceeded radially about the swivel axis 111 for swiveling to occur. The frictional resistance caused by radial pressure of the stick-slip frictional fit acts between the thrust journal 113 and the swivel bearing 121 at the coupling diameter 135. A swiveling torque needed for the coupling to swivel is directly proportional the coupling diameter 135, the swiveling torque being a coupling radius of the coupling diameter times the frictional resistance between the swivel bearing 121 and the thrust journal 113.

The swiveling torque available is proportional to a contact length of the body surface contacted by the massage tool 101, measured perpendicular to the swivel axis 111. For the swiveling torque available to exceed the swiveling resistance torque required, causing the coupling 100 to swivel, a width of the massage tool 101 must be greater than the coupling diameter 135. Herein, the ratio of the massage tool contact length to the coupling diameter is defined as the swiveling diameter ratio. In one embodiment of the invention, a massage tool 101 attached to a reciprocating shaft 105 by a coupling 100 has a swiveling diameter ratio of at least 6.0 to facilitate swiveling during operation on the body of a patient. In another embodiment, a reciprocating massage tool system according to the invention has a swiveling diameter ratio of at least 4.0. In another embodiment, the system has a swiveling diameter ratio of at least 2.5. In another embodiment, the system has a swiveling diameter ratio of at least 1.5. For a tapotemental hand sized tool having a swiveling ratio less than 6.0, the maximum friction-fit for extraction needs to be less than about 5.0 lb. In other embodiments swiveling resistance is minimized for the swivel coupling 100 to allow almost any width of swiveling tool to swivel.

The coupling diameter 135 may be determined by the strength of the thrust journal 113 that is needed for it to remain operatively rigid under bending and compressive loading imposed when the massage tool 101 is reciprocating and forced against the body surface 35. Bending of the swivel coupling 100 (FIG. 38) produces significant frictional swiveling resistance. To transfer bending without excessive swiveling resistance, the swivel bearing length 133 should be greater than the stroke length 107 (FIG. 32) and 1.5 times greater than the coupling diameter 135. A swivel coupling 100 having a swivel bearing length 133 less than 1.5 times the coupling diameter 135 is in danger of having the thrust journal 113 roll out of the cup 115 from loss of fit tightness as the materials flex or deform from fluctuating forces and bending stresses 167 and 168 (FIG. 38).

Figure 39:
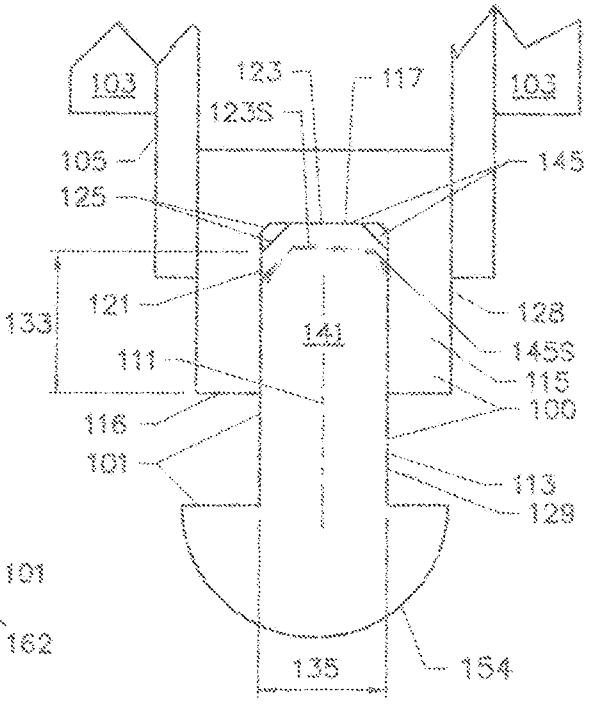
FIG. 39 is a cross-sectional view taken along section G-G of FIG. 32 of another embodiment according to the invention showing slip and vacuum retention of a swivel coupling for a hemispherical massage tool coupled to a reciprocating motor.

FIG. 39 shows an embodiment wherein the thrust journal 113 and the cup 115 are configured having a vacuum space 145 between the thrust end 123 and the thrust bearing 117 so that differential pressure acting on the coupling area 143 (FIG. 33) of the swivel coupling (e.g. the area of a circle having the coupling diameter 135) provides force in addition to friction to maintain engagement of the swivel coupling 100. In this configuration the fit of the thrust journal 113 within swivel bearing 121 substantially restricts air from flowing into the vacuum space 145. The thrust end 123 of the thrust journal 113 and the thrust bearing 117 of the cup 115 may be mutually shaped to create a vacuum space 145 having a volume ideally zero but less than 5% of a cup volume 141 when the swivel coupling 100 is fully engaged. For purposes herein the cup volume 141 is defined as the coupling area 143 times the swivel bearing length 133. When the thrust end 123 may occasionally slip to a position 123S (FIG. 39) away from fully engaging or abutting the thrust bearing 117, a vacuum is created in the vacuum space 145 causing a vacuum force from differential air pressure acting on the coupling area to return the thrust end 123 toward the thrust bearing 117 and full engagement.

The embodiments shown in FIG. 32 through 37 may also be configured to employ vacuum force to improve retention of the thrust journal 113 within the cup 115. As further explained below, in some embodiments the vacuum force comprising differential atmospheric pressure acting on the coupling area 143 reduce axial movement and distal drift of the thrust journal 113 within the cup 115 to maintain engagement of the swivel coupling 100. The vacuum force is created when the thrust end 123 after full engagement separates, that is, slips away from the thrust bearing 117 of the cup 115, thereby expanding the vacuum space 145 (FIG. 39) and reducing its internal pressure. As separation begins, the internal pressure becomes ideally zero if there is no air in the vacuum space 145. This causes the vacuum force to equal local atmospheric pressure times the coupling area 143 (FIG. 33). The presence of any air in the vacuum space 145 increases its internal pressure upon separation from full engagement, thereby reducing the vacuum force, increasing slip and drift (as further explained below), reducing engagement length, and allowing air to leak into the vacuum space. When the tool is reciprocating in the contactless mode, air may leak into the vacuum space 145, reducing the vacuum force and leading eventually to pressurization of the vacuum space and disengagement of the tool 101 from the reciprocating shaft. If the massage tool contacts a surface prior to disengagement, the coupling 100 may fully reengage, and expel excess or leaked air from the vacuum space 145.

The vacuum force is the coupling area 143 multiplied by the difference between local atmospheric pressure and the absolute pressure within the vacuum space 145. To be effective full vacuum force must exceed several times the weight of the massage tool 101 that includes the affixed coupling half of the swivel coupling assembly 100. For example, an embodiment of massage tool 101 shown in FIG. 32 has a weight of about 0.162 pounds and a coupling diameter of ⅜ inches. The maximum vacuum force on the coupling area at sea level is about 1.62 pounds, about 10 times greater than the weight of this massage tool 101. Some embodiments may include a cushion 146 between the thrust end 123 and the thrust bearing 117 to reduce impact and noise. One such embodiment of the cushion 146 is shown in FIG. 37 as a resilient elastomer bonded to thrust journal 113 to form the thrust end 123, the cushion 146 configured having a metallic bearing surface forming the thrust end 123 that swivels against the thrust bearing 117. Some exemplary materials of construction for the cushion 146 are rubber, elastomer, metal spring, or a resilient elastomer laminated to metal or plastic.

Some embodiments may use lubrication to increase the vacuum force and retention time before the occurrence of slip. Lubrication may increase retention time of swivel couplings 100 having wear from use or otherwise having excessive distal drift. Lubrication may reduce frictional swiveling resistance and thereby improving swiveling of the massage tool 101.

To further reduce swiveling resistance of some embodiments, viscous lubrication, wax, or other fillers may be applied to the cup 115 or to the thrust end 123 to fill the vacuum space 145, to thereby restrict air from flowing between the thrust journal 113 and the swivel bearing 121 into the vacuum space 145, or to control swivel bearing 121 or thrust bearing 117 friction. Lubrication or fillers may allow smaller massage tools 101 to swivel and larger massage tools 101 to swivel more freely while remaining aligned with the body surface. For embodiments that employ reciprocating motors 103 having higher stroke rates (cycles per second or Hertz), longer stroke lengths 107, and heavier massage tools 101, when reciprocating in the contactless mode acceleration of the reciprocating shaft 105 acting on the mass of the tool 101 may briefly exceed a static friction capacity of the stick-slip frictional fit of the swivel coupling 100, and thereby cause the thrust journal 113 to slip within the swivel bearing 121 and the thrust end 123 to lose contact with the thrust bearing 117. For example, a reciprocating motor having a maximum acceleration of 1237 ft/sec$^2$ (38.4 times gravity) produces a maximum force acting on a 0.156 lb. massage tool 101 of about 6 lb. If axial static frictional resistance is 5 lb. for the swivel coupling 100 of this embodiment the thrust journal 113 will slip axially within the thrust bearing 115 during the short period of maximum acceleration. Acceleration cycles during each stroke from the maximum acceleration at the extremes of the stroke to a minimum acceleration of zero at a middle of the stroke. This causes the thrust journal 113 to "slip" within the thrust bearing at each end of the stroke and to "stick" together as they traverse the middle of the stroke. This physical phenomenon is an example of stick-slip frictional motion occurring at a forced frequency. For most embodiments of reciprocating motors 103 (FIG. 32) acceleration of the reciprocating shaft 105 in the distal direction is almost identical to its acceleration in the proximal direction. Some very slight variations in distal and proximal acceleration may occur due to the mechanisms creating the reciprocating stroke such as crankshafts, swash plates, scrolls, scotch yokes, solenoids, pistons, magnetics, springs or other means and devices. However, having nearly identical slip lengths at distal and proximal extremes of the stroke allows the distal coupling half 129 (FIG. 32) to slip distally away from the proximal coupling half 128 so that the thrust end 123 is at least a maximum slip length 188 (FIG. 40) away from the thrust bearing 121. When the swivel coupling 100 is reciprocating in the contactless mode noise is reduced and swiveling is improved.

FIG. 40 is a graph illustrating dynamics of stick-slip frictional motion of swivel coupling 100 reciprocating at a forced frequency. The graph shows velocity, acceleration, and relative positions of a pair of coupling halves versus time for an embodiment of swivel coupling 100 operating in a contactless mode. The graph depicts the swivel coupling 100 reciprocated through a stroke period 170 for one stroke that is a fraction of a second along a timeline 160, the horizontal axis of the graph. The stroke shown and discussed herein begins at time 171 and ends at time 179. The graph illustrates continuous reciprocating motion extending from prior to a start time 171 through to after a stroke end time 179 of the stroke period 170. Position curve 180 is a plot of location verses time of the proximal coupling half that in some embodiments is the thrust journal 113 and in other embodiments is the cup 115 as shown in FIG. 32 through FIG. 39. As shown in FIG. 32 and FIG. 40 the proximal coupling half and the reciprocating shaft 105 reciprocate a stroke length 107 between proximal extreme position P and distal extreme position D. The stroke considered here and depicted in the graph of FIG. 40 begins at time 171 when the position of the proximal coupling half is at the midpoint of the stroke length 107. The velocity of the proximal coupling half is shown in graph of FIG. 40 as a velocity curve 182 having a distal and proximal maximum velocity 183. The distal velocity (toward the patient) of the proximal coupling half is at its maximum velocity 183 as it passes the middle of the stroke length 107 at time 171. Acceleration of the proximal coupling half is shown as an acceleration curve 184 having a proximal and distal maximum acceleration 185. The acceleration of the proximal coupling half is zero at stroke time 171. The position curve 180, the velocity curve 182 and the acceleration curve 184 are each approximately sinusoidal in shape as is normal for reciprocating motion at higher reciprocation rates. To differentiate the curves the graph depicts them with differing magnitudes from the neutral axis, timeline 160. Position, velocity, and acceleration are vectors each having different units of magnitude, so each curve shown in FIG. 40 is only relative to its own maximum magnitude, to distal and proximal directions and to the common neutral axis timeline 160.

In FIG. 40 the location of the distal coupling half along the timeline 160 is shown by position curve 181. At stroke time 171 the proximal and distal coupling halves are moving distally (toward the body surface 35) at maximum velocity 183 (curve 182) passing the middle of the stroke length 107. At this stroke time 171 the acceleration (curve 184) is zero so friction keeps the coupling halves sticking together. Then as proximal acceleration (curve 184) from the reciprocating motor increases the coupling halves begin to slow. At stroke time 172 the acceleration (curve 184) reaches a static friction limit 186. Upon exceeding the static friction limit 186 the acceleration acting on the combined mass of the massage tool 101 (that includes the mass of the distal coupling half) exceeds the static friction limit 186 of the friction-fit of the swivel coupling 100 causing the thrust journal 113 to slip within swivel bearing 121. When slip occurs the distal coupling half is still being accelerated (or decelerated) by dynamic (a.k.a. kinetic) friction acting with a reduced force. At stroke time 173 the distal coupling half (curve 181) continues to slip away from the proximal coupling half (curve 180) as acceleration reaches its maximum 185 proximally and the proximal coupling half reaches the distal extreme position D. At stroke time 174 acceleration (curve 184) returns to below the static friction limit 186, slip stops at a maximum slip length 188 and the coupling halves stick together as proximal acceleration diminishes. At stroke time 175 acceleration (curve 184) is zero, the coupling halves are moving at maximum proximal velocity 183 (curve 182) sticking together at the maximum slip length 188. At stroke time 176 distal acceleration (curve 184) starts to exceed the static friction limit 186, the thrust journal 113 starts to slip within the swivel bearing 121 and the distal coupling half (curve 181) starts to slip proximally. At stroke time 177 the proximal coupling half (curve 180) is at proximal extreme position P, its velocity (curve 182) is zero, its acceleration (curve 184) is at the maximum 185 distally, and the distal coupling half (curve 181) is continuing to slip proximally. At stroke time 178 acceleration (curve 184) of the proximal coupling half (curve 180) returns to below the static limit 186, slip of the distal coupling half (curve 181) stops as the thrust journal 113 returns to its initial position within the swivel bearing 121. At stroke time 179 the stroke cycle is complete and repeats.

Referring to FIG. 40, slip occurs as the proximal coupling half (curve 180) nears proximal extreme end P or D of the stroke length 107 and is decelerated to zero velocity (curve 182) then reaccelerated by the reciprocating motor 103 (FIG.

32). When the proximal coupling half is near the middle of the stroke length 107, force from acceleration acting on the mass of the massage tool 101 is less than the static friction limit 186, slip stops, and the thrust journal 113 (FIG. 32) sticks within the cup 115 (FIG. 32) and moves with it. FIG. 40 shows the maximum velocity 183 (curve 182) of the proximal coupling half attached to the reciprocating shaft 105 (FIG. 32) is 90 degrees out of phase with the maximum acceleration 185 (curve 184). The maximum velocity 183 and therefore maximum movement of the coupling halves occurs near the middle of the stroke length 107 at stroke times 171, 175 and 179. Slip occurs when acceleration (curve 184) of the proximal coupling half is near maximum and its velocity (curve 182) is diminished so that when the distal coupling half (curve 181) slips it does not move very far relative to the proximal coupling half (curve 180). An elapsed stick time 190 alternates rapidly with an elapsed slip time 191, completing four transitions during the single stroke period 170. The maximum slip length 188 between the coupling halves is short relative to the stroke length 107 and distal slip reverses proximal slip so the swivel coupling 100 moves very little and remains engaged as it reciprocates, even in the contactless mode, when not reciprocating against the body surface 35.

Stick-slip friction (a.k.a. slip and stick, stick and slip, slip-stick, or sticky friction) is a phenomenon studied and observed elsewhere in motion dynamics. The stick-slip phenomenon involves surfaces alternately sticking to each other and sliding over each other because of a difference between static and kinetic friction forces acting between them. A bow being drawn across strings of a violin is an example of stick-slip friction acting on a natural harmonic frequency of a vibrating string. High frequency screeching of tires and breaks is caused by stick-slip friction. Another example is air pressure acting on a piston in a cylinder moving in low frequency starts and stops as the rings of the piston alternately stick then slide on the cylinder walls. Often stick-slip friction is undesirable causing sliding machine elements to experience excess friction and wear and create noise and frictional heat. In the present invention the swivel coupling 100 exploits stick-slip friction operating at a forced frequency of the reciprocating motor 103 to maintain engagement of the coupling while allowing the massage tool 101 with its distal coupling half to swivel. When slip length at one end of a stroke differs from slip length at the opposite end, the difference is the distance the thrust journal 113 drifts within the cup 115 during the stroke. When swivel coupling 100 is reciprocating continuously "drift" as defined herein may vary in magnitude, speed, and direction depending on interaction of surface imperfections, tiny machining groves, molecular bonding, lubrication, debris, vacuum or air pressure acting between the thrust journal 113 and the cup 115. Drift may cause the swivel coupling 100 to distally extend or proximally contract. Distal drift may eventually cause disengagement of the coupling. Proximal drift will maintain engagement with the thrust end 123 possibly remaining in contact with or bouncing against the thrust bearing 117. Maximum acceleration causing slip is substantially higher than gravity so the angle of the stroke axis 111 with respect to vertical has only a small effect on drift.

When reciprocating in the contactless mode and stick-slip conditions exist, the swivel coupling 100 and coupled massage tool 101 may begin to swivel rather than drifting axially and that swiveling may reverse randomly. Like a car slipping on ice, once the static friction capacity of the tires on the ice is exceeded, the car may spin or slide in any direction. Similarly when slip occurs within the swivel coupling 100 drift may include swiveling. This unexpected random swiveling occurring at 90 degrees to the energy of the stroke is chuckian drift named for Charles L. Williams, P. E. who first theorized its cause: residual micro-mechanical or molecular surface irregularities possibly caused by machining. When a massage tool 101 is reciprocating in a contactless mode chuckian drift is usually the first indication that stick-slip motion is occurring within the swivel coupling 100. When the swivel coupling 100 is reciprocating in the contactless mode the thrust journal 113 sticks to the swivel bearing in the middle of the stroke and slips at the extremes of the stroke maintaining its position in a reciprocating frictional eddy like a floating log stuck in a whirlpool.

During reciprocation in the contactless mode when distal drift is occurring it may cause the swivel coupling 100 to become disengaged over time. The operator may reduce this inconvenient event by keeping operation in the contactless mode to a relatively brief period. For example, the operator may use contact with the body surface 35 to stop distal drift and cause the coupling 100 to fully reengage. Alternatively, the operator may use a hand or some other surface to similarly effect reengagement prior to the occurrence of a full disengagement event.

Drift is a random phenomenon, but a drift speed increases as full disengagement is approached. In some embodiments, when an engaged length of the thrust journal 113 becomes less than about one half the length 133 of the swivel bearing 121, disengagement may be sudden. This may be caused when distal drift reduces the engaged length of the thrust journal 113 within swivel bearing 121 reducing the frictional resistance of the swivel coupling 100 thereby increasing the drift speed. When the engagement length is reduced massage tool 101 may oscillate perpendicularly to the swivel axis 111 causing the thrust journal 113 to bend within the cup 115 thereby accelerating drift speed. Acceleration of drift varies inversely with the instantaneous frictional resistance of the swivel coupling 100 and may be affected the force of differential air pressure acting on the coupling area. Drift speed increases with increased acceleration caused by greater frequency (squared) and greater stroke length. Drift speed also increases with increasing mass of the massage tool 101. For embodiments of swivel coupling 100 to be capable of experiencing stick-slip drift the static frictional resistance for extraction of the thrust journal 113 from the cup 115 should be at least about 10 times the combined weight of massage tool and affixed coupling half. In some other embodiments operating with lower acceleration and without slip, that same static frictional resistance for extraction should be at least 5 times the combined weight of the massage tool 101. In any of these embodiments to maintain coupling engagement the swivel bearing length 133 should be greater than the stroke length 107, and greater than 1.5 times the coupling diameter 135.

When the massage tool 101 is reciprocating against the body surface 35, acceleration and rebound can cause the swivel coupling 100 to slip which may allow the massage tool 101 to swivel infinitesimally and more easily. When the static friction capacity of the swivel coupling 100 is exceeded by acceleration or other forces that causes slip, swiveling is improved because swiveling friction is reduced to kinetic friction. In some embodiments, a swivel coupling 100 reciprocating with maximum acceleration force less than the static friction capacity of the friction-fit may also swivel when the massage tool 101 is reciprocating against the body surface 35. Lubrication may also be applied to the thrust journal 113 or within the cup to assist swiveling of the swivel coupling 100.

Figure 41:
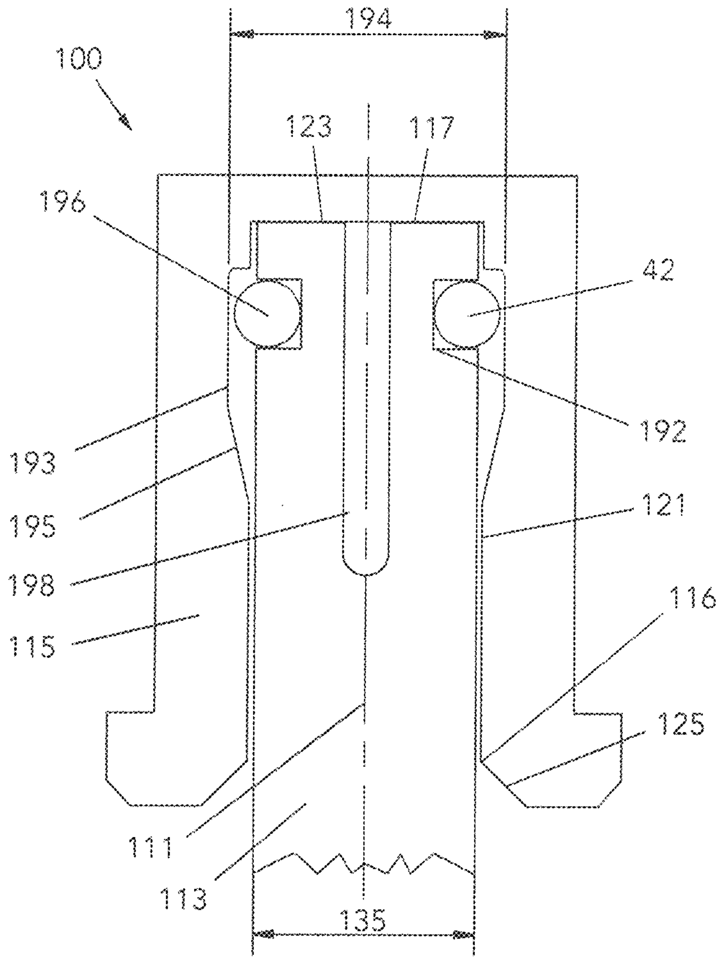
FIG. 41 is a cross-sectional view taken along section G-G of FIG. 32 of another embodiment according to the invention showing a stick-slip frictional coupling having an o-ring as a frictional spring.

FIG. 41 is a cross-sectional view taken along a portion of section G-G of FIG. 32, showing another embodiment according to the invention of swivel coupling 100. In this embodiment, the thrust journal 113 is configured having a retention groove 192 that retains an o-ring 42. The o-ring 42 is a friction spring 196. That is because when the thrust journal 113 is inserted into the cup 115 the o-ring 42 is compressed to a coupling diameter 135 within the swivel bearing 121 causing a maximum frictional resistance to act between the thrust journal 113 and the swivel bearing 121. The swivel bearing 121 is configured having a slip groove 193 having a slip groove diameter 194 greater than the coupling diameter 135. The slip groove 193 allows the o-ring 42 to extend within the slip groove 193 when the thrust end 123 abuts the thrust bearing 117. When the o-ring 42 is extended within the slip groove 193 the frictional resistance acting between thrust journal 113 and the swivel bearing 121 is reduced to a minimum frictional resistance. An axial taper 195 between the coupling diameter 135 and the slip groove diameter 194 recompresses the o-ring 42 when the thrust journal 113 is extracted from the cup 115. A chamfer 125 (or a fillet) around the rim 116 of the cup 115 assists to compress the o-ring 42 when the thrust journal 113 is inserted into the cup 115. During reciprocation of the swivel coupling 100 a cylindrical portion of the slip groove 193 having the slip groove diameter 194 allows the thrust end 123 to slip or drift away from the thrust bearing 117. Slip or drift may allow the o-ring 42 to reciprocate against the axial taper 195 producing an additional force that acts at a conical angle to the swivel axis 111. The additional force then acting between the o-ring 42 and the axial taper 195 has two components that act perpendicular to each other. One component acts radially perpendicular to the stroke axis 111 compressing the o-ring 42 and increasing frictional resistance acting between the thrust journal 113 and the swivel bearing 121. The other component acts parallel to the stroke axis 111 causing the thrust journal 113 and thrust end 123 to drift back towards the thrust bearing 117 maintaining engagement of swivel coupling 100. This embodiment of swivel coupling 100 shown in FIG. 41 is shown without attachments but may be configured to attach to massage tool 101 and reciprocating shaft 105 as shown in FIGS. 31 through 39. The o-ring may be made from a variety of flexible elastomers or may be a split circular spring made from various metals or rigid plastics.

Figure 42:
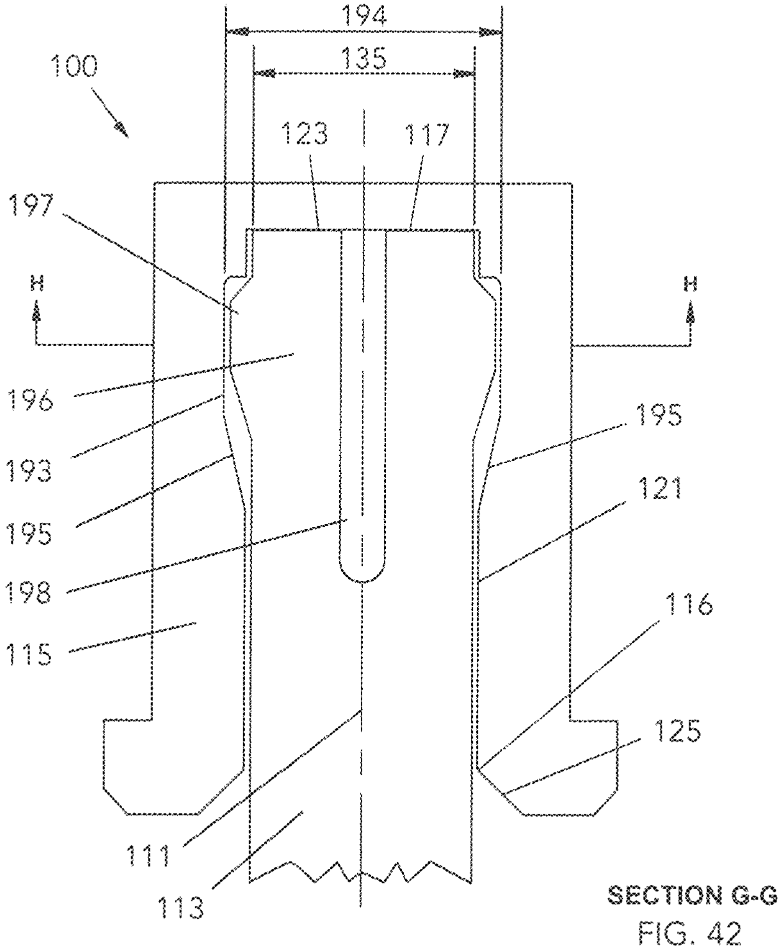
FIG. 42 is a cross-sectional view taken along section G-G of FIG. 32 of another embodiment according to the invention showing a stick-slip frictional coupling having friction shoes as a frictional spring.

FIG. 42 is a cross-sectional view taken along a portion of section G-G of FIG. 32 showing another embodiment according to the invention of swivel coupling 100. In this embodiment, a friction spring 196 is integrally formed on the thrust journal 113 by a bifurcating gap 198. The friction spring 196 is formed having one or more friction shoes 197 that are forced to fit within the coupling diameter 135 when the thrust journal is inserted into the cup 115. During insertion the friction shoes 197 pressing against the swivel bearing 121 compress the friction spring 196 causing a maximum frictional resistance to act between the thrust journal 113 and the swivel bearing 121. The swivel bearing 121 is configured having a slip groove 193 having a slip groove diameter 194 greater than the coupling diameter 135. The slip groove 193 allows the friction shoes 197 to extend within the slip groove 193 when the thrust end 123 abuts the thrust bearing 117. When the friction shoes 197 are extended within the slip groove 193 the frictional resistance acting between thrust journal 113 and the swivel bearing 121 is reduced to a minimum frictional resistance. An axial taper 195 between the coupling diameter 135 and the slip groove diameter 194 recompresses the friction spring 196 when the thrust journal 113 is extracted from the cup 115. A chamfer 125 (or a fillet) around the rim 116 of the cup 115 assists to compress the friction spring when the thrust journal 113 is inserted into the cup 115. During reciprocation of the swivel coupling 100 a cylindrical portion of the slip groove 193 having the slip groove diameter 194 allows the thrust end 123 to slip or drift away from the thrust bearing 117. Slip or drift may allow the friction shoes 197 to reciprocate against the axial taper 195 producing an additional force that acts at a conical angle to the swivel axis 111. The additional force then acting between the friction shoes 197 and the axial taper 195 has two components that act perpendicular to each other. One component acts radially perpendicular to the stroke axis 111 compressing the friction spring 196 and increasing frictional resistance acting between the thrust journal 113 and the swivel bearing 121. The other component acts parallel to the stroke axis 111 causing the thrust journal 113 and thrust end 123 to drift back towards the thrust bearing 117 maintaining engagement of swivel coupling 100. This embodiment of swivel coupling 100 shown in FIG. 42 is shown without attachments but may be configured to attach to massage tool 101 and reciprocating shaft 105 as shown in shown in FIGS. 31 through 39.

Figure 43:
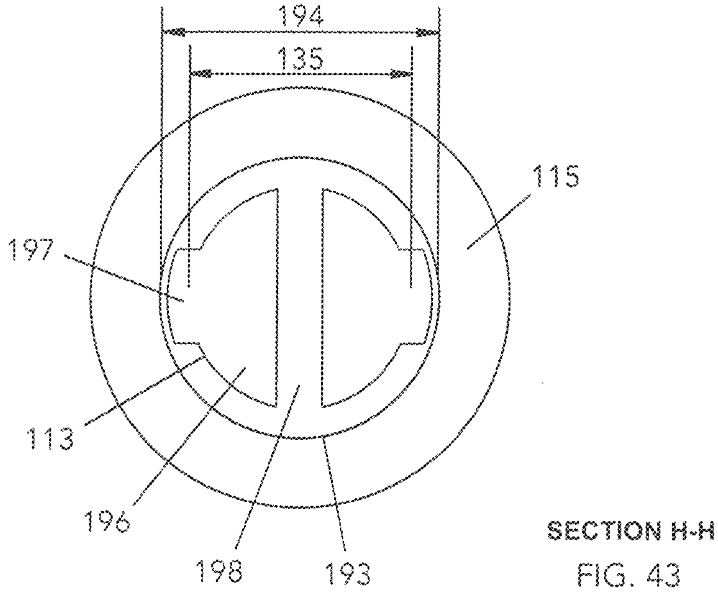
FIG. 43 is a cross-sectional view taken along section H-H of FIG. 42.

FIG. 43 is a cross-sectional view taken along section H-H of FIG. 42 showing the friction shoes 197 attached to the two halves of the friction spring 196 with the friction shoes 197 extended within the slip groove 193. Skilled artisans will appreciate that other embodiments of a friction spring 196 integrally formed on the thrust journal 113 are possible in which multiple gaps 198 may be formed to create more than two friction shoes 197, similarly designed to be force-fit within the coupling diameter 135 when the thrust journal is inserted into the cup 115. For example, two bifurcating gaps offset by 90 degrees could form a friction spring having four friction shoes, etc.

FIGS. 41, 42 and 43 show for clarity, exaggerated gaps between the swivel bearing 121 and the thrust journal 113, and between the slip groove and frictional elements. In actuality there may be no clearance or even an interference fit between these surfaces as may be required to achieve a working stick slip frictional fit of the thrust journal 113 within the swivel bearing 121. Other aspects of the embodiments swivel coupling 100 are relatively exaggerated to show function.

The embodiments of swivel coupling 100 shown in FIGS. 41, 42 and 43 each have a stick-slip frictional fit that allows swiveling to best occur when friction elements, the o-ring 42 or the friction shoe, are extended within the slip groove 193. When during reciprocation the friction elements are in contact with a narrower portion of axial taper 195 or in contact with the swivel bearing 121 between the axial taper 195 and the rim 116, the frictional resistance acting between the thrust journal 113 and the swivel bearing 121 increases so that stick slip motion may no longer occur. With the embodiments of the swivel coupling 100 shown in FIGS. 32 through 39 the stick-slip frictional movement during reciprocation is approximately continuous along swivel bearing 121 except when drift may cause the thrust end 123 to approach within a coupling diameter 133 of the rim 116, whereupon disengagement of the swivel coupling 100 may suddenly occur.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

The invention claimed is:

1. A swivel coupling for removably coupling a massage tool to a reciprocating shaft of a reciprocating motor, the shaft having a stroke axis and a stroke length, the swivel coupling comprising:

a cup having a swivel bearing, a thrust bearing, a rim, and a coupling diameter; and a thrust journal stick-slip frictionally fit to the cup allowing the thrust journal to swivel within the swivel bearing and to slip along the stroke axis during reciprocation of the shaft.

2. The swivel coupling of claim 1, configured with the thrust journal having an attachment end and a thrust end opposite the attachment end, the thrust end configured to bear and swivel on the thrust bearing while the attachment end extends beyond the rim of the cup.

3. The swivel coupling of claim 1, wherein the swivel bearing has a length greater than about one and one half times the coupling diameter.

4. The swivel coupling assembly of claim 1, wherein the swivel bearing has a length greater than the stroke length of the shaft.

5. The swivel coupling assembly of claim 1, configured so that the thrust journal is extractable from the swivel bearing by an axial force of less than 5 lbs when the shaft is not reciprocating.

6. The swivel coupling assembly of claim 1 having a swiveling resistance of less than 20 ounce-inches of torque acting between the thrust journal and the swivel bearing.

7. The swivel coupling of claim 1, wherein the coupling diameter is less than five-eighths of an inch.

8. The swivel coupling of claim 1, wherein the thrust journal within the swivel bearing substantially restricts air flow to the thrust bearing.

9. The swivel coupling of claim 1, further comprising a lubricant applied between the thrust journal and the swivel bearing.

10. The swivel coupling of claim 1, wherein the thrust journal further comprises a thrust end, and wherein one or both of the thrust bearing and the thrust end comprise a surface formed as a solid of revolution about a swivel axis defined by the thrust journal swiveling within the swivel bearing.

11. The swivel coupling of claim 1, wherein the thrust journal further comprises a friction spring configured to be compressed by the thrust journal being inserted into the cup, wherein compression of the friction spring increases frictional resistance to movement of the thrust journal within the cup.

12. The swivel coupling of claim 11, the thrust journal further comprising a thrust end and wherein a slip groove is formed in the swivel bearing, the slip groove having a diameter greater than the coupling diameter allowing the friction spring to extend within the slip groove when the thrust end abuts the thrust bearing, providing a minimum frictional resistance acting between the thrust journal and the swivel bearing.

13. The swivel coupling of claim 12, wherein the slip groove tapers axially.

14. The swivel coupling of claim 12, wherein the slip groove comprises a cylindrical portion having the slip groove diameter, allowing the thrust end to slip away from the thrust bearing when the minimum frictional resistance acts between the thrust journal and the swivel bearing.

15. The swivel coupling of claim 12, wherein the thrust journal comprises a retention groove retaining the friction spring.

16. The swivel coupling of claim 15, wherein the friction spring comprises an o-ring.

17. The swivel coupling of claim 12, wherein the slip groove has an axial length less than the coupling diameter.

18. The swivel coupling of 11, wherein the friction spring is integrally formed on the thrust journal, the friction spring having one or more attached friction shoes that engage the swivel bearing and extend within the slip groove.

19. The swivel coupling of claim 1, wherein the cup is attached to the reciprocating shaft and the thrust journal is attached to the massage tool.

20. The swivel coupling of claim 1, wherein the cup comprises an adapter configured to attach the swivel coupling to the reciprocating shaft or to the massage tool.

21. The swivel coupling of claim 1, wherein the thrust journal is attached to the reciprocating shaft and the cup is attached to the massage tool.

22. The swivel coupling of claim 1, wherein the thrust journal further comprises an attachment end, wherein the attachment end of the thrust journal comprises an adapter configured to attach the swivel coupling to the reciprocating shaft or to the massage tool.

23. The swivel coupling of claim 1, wherein the thrust journal further comprises a thrust end and wherein a resilient cushion is positioned between the thrust bearing and the thrust end.

* * * * *